United States Patent
Tiirola et al.

(10) Patent No.: US 12,127,250 B2
(45) Date of Patent: Oct. 22, 2024

(54) IMPROVING OPERATION OF CELLULAR COMMUNICATION NETWORKS ON UNLICENSED FREQUENCY BANDS

(71) Applicant: Nokia Technologies Oy, Espoo (FI)

(72) Inventors: Esa Tapani Tiirola, Oulu (FI); Kari Juhani Hooli, Oulu (FI); Timo Erkki Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 693 days.

(21) Appl. No.: 17/286,994

(22) PCT Filed: Nov. 2, 2018

(86) PCT No.: PCT/EP2018/080024
§ 371 (c)(1),
(2) Date: Apr. 20, 2021

(87) PCT Pub. No.: WO2020/088775
PCT Pub. Date: May 7, 2020

(65) Prior Publication Data
US 2021/0392684 A1    Dec. 16, 2021

(51) Int. Cl.
*H04W 74/0816* (2024.01)
*H04W 72/0453* (2023.01)
*H04W 72/1268* (2023.01)
*H04W 74/00* (2009.01)

(52) U.S. Cl.
CPC ... *H04W 74/0816* (2013.01); *H04W 72/0453* (2013.01); *H04W 72/1268* (2013.01); *H04W 74/006* (2013.01)

(58) Field of Classification Search
None
See application file for complete search history.

(56) References Cited

U.S. PATENT DOCUMENTS

| | | | |
|---|---|---|---|
| 2016/0233989 A1 | 8/2016 | Belghoul et al. | |
| 2017/0135128 A1 | 5/2017 | Yerramalli et al. | |

(Continued)

FOREIGN PATENT DOCUMENTS

| | | | |
|---|---|---|---|
| CN | 105611637 A | 5/2016 | |
| CN | 107371274 A | 11/2017 | |

(Continued)

OTHER PUBLICATIONS

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

(Continued)

*Primary Examiner* — Jenkey Van
(74) *Attorney, Agent, or Firm* — Barta Jones, PLLC

(57) ABSTRACT

According to an example aspect of the present invention, there is provided a method for a cellular wireless device, including, obtaining, from a cellular base station, a first opportunity for an uplink data transmission on an unlicensed frequency band, wherein the first opportunity is within a first period reserved for first transmission opportunities on a frequency channel, upon detecting that the frequency channel is occupied at a beginning of the first opportunity, determining a second opportunistic resource for the uplink data transmission or a downlink transmission and receiving or transmitting using the second opportunistic resource.

19 Claims, 10 Drawing Sheets

(56) References Cited

U.S. PATENT DOCUMENTS

| | | | |
|---|---|---|---|
| 2018/0027582 A1* | 1/2018 | Yerramalli | H04L 5/0051 |
| | | | 370/336 |
| 2018/0227911 A1 | 8/2018 | Belghoul et al. | |
| 2018/0227944 A1* | 8/2018 | Yerramalli | H04W 72/1268 |
| 2018/0270860 A1 | 9/2018 | Bhorkar et al. | |
| 2018/0332579 A1* | 11/2018 | Kang | H04W 72/566 |
| 2020/0145996 A1* | 5/2020 | Sun | H04W 72/21 |
| 2021/0368351 A1* | 11/2021 | Cui | H04W 74/0808 |

FOREIGN PATENT DOCUMENTS

| | | |
|---|---|---|
| CN | 108029146 A | 5/2018 |
| WO | WO 2017/080572 A1 | 5/2017 |
| WO | WO 2017/180179 A1 | 10/2017 |

OTHER PUBLICATIONS

"On the Frame structure and Wideband operation for NR-U", 3GPP TSG RAN WG1 Meeting #94bis, R1-1810613, Agenda: 7.2.2.2, Nokia, Oct. 8-12, 2018, 13 pages.

"Frame structure for NR-U", 3GPP TSG RAN WG1 Meeting # 94bis, R1-1810857, Agenda: 7.2.2.2, Samsung, Oct. 8-12, 2018, 5 pages.

"NR numerology and frame structure for unlicensed bands", 3GPP TSG RAN WG1 Meeting #94bis, R1-1810123, Agenda: 7.2.2.2, Huawei, Oct. 8-12, 2018, 14 pages.

"Frame structures for NR unlicensed operation", 3GPP TSG RAN WG1 Meeting #94bis, R1-1811147, Agenda: 7.2.2.2, Sharp, Oct. 8-12, 2018, pp. 1-4.

"TxOP Frame Structure for NR unlicensed", 3GPP TSG RAN WG1 Meeting #94bis, R1-1811249, Agenda: 7.2.2.2, Qualcomm Incorporated, Oct. 8-12, 2018, pp. 1-12.

"3rd Generation Partnership Project; Technical Specification Group Radio Access Network; NR; Physical layer procedures for data (Release 15)", 3GPP TS 38.214, V15.3.0, Sep. 2018, pp. 1-96.

"3rd Generation Partnership Project; Technical Specification Group Radio Access Network; NR; Physical layer procedures for control (Release 15)", 3GPP TS 38.213, V15.3.0, Sep. 2018, pp. 1-101.

"3rd Generation Partnership Project; Technical Specification Group Radio Access Network; Study on Licensed-Assisted Access to Unlicensed Spectrum; (Release 13)", 3GPP TR 36.889, V13.0.0, Jun. 2015, pp. 1-285.

"3rd Generation Partnership Project; Technical Specification Group Radio Access Network; Physical layer procedures for shared spectrum channel access (Release 15)", 3GPP TS 37.213, V15.1.0, Sep. 2018, pp. 1-20.

International Search Report and Written Opinion received for corresponding Patent Cooperation Treaty Application No. PCT/EP2018/080024, dated Jun. 25, 2019, 12 pages.

Office action received for corresponding Indian Patent Application No. 202147024142, dated Feb. 23, 2022, 6 pages.

Office action received for corresponding European Patent Application No. 18796926.6, dated Jul. 17, 2023, 6 pages.

Office action received for corresponding Chinese Patent Application No. 201880099172.5, dated Oct. 17, 2023, 9 pages of office action and no page of translation available.

* cited by examiner

IMPROVING OPERATION OF CELLULAR COMMUNICATION NETWORKS ON UNLICENSED FREQUENCY BANDS

CROSS REFERENCE TO RELATED APPLICATION

This patent application is a U.S. National Stage application of International Patent Application Number PCT/EP2018/080024 filed Nov. 2, 2018, which is hereby incorporated by reference in its entirety.

FIELD

Various example embodiments relate in general to cellular communication networks, and improving operation of such networks on unlicensed frequency bands.

BACKGROUND

Resources of cellular communication networks are typically limited. Hence, efficient operation is important in various cellular networks, such as, in networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR. One of the topics in the 3GPP discussions is related to operation of cellular communication networks on unlicensed frequency bands. More specifically, there is a need to provide improved methods, apparatuses and computer programs for enabling efficient operation of cellular communication networks on unlicensed frequency bands. Similar enhancements may also be employed in other cellular networks as well.

SUMMARY

According to some aspects, there is provided the subject-matter of the independent claims. Some embodiments are defined in the dependent claims.

According to a first aspect, there is provided a first method for a cellular wireless device, comprising, obtaining, from a cellular base station, a first opportunity for an uplink data transmission on an unlicensed frequency band, wherein the first opportunity is within a first period reserved for first transmission opportunities on a frequency channel, upon detecting that the frequency channel is occupied at a beginning of the first opportunity, determining a second opportunistic resource for the uplink data transmission or a downlink transmission and receiving or transmitting using the second opportunistic resource.

According to the first aspect, the first period reserved for first transmission opportunities may be acquired by the cellular base station of a cellular communication system.

According to the first aspect, the second opportunistic resource may be a second opportunity for the uplink data transmission and a difference in time between the first and the second opportunity for the uplink data transmission is at least as long as a slot.

According to the first aspect, the first method may further comprise determining an ending time of the first period reserved for first transmission opportunities and/or an ending time of a maximum period of time based on a received signalling, wherein the received signalling comprises a group or cell common control signalling.

According to the first aspect, the first method may further comprise determining an ending time of a maximum period of time, wherein the ending time of the maximum period of time is equal to, or larger than, an ending time of the first period reserved for first transmission opportunities.

That is to say, the first method may further comprise determining that the ending time of the maximum period of time is later than the ending time of the first period reserved for first transmission opportunities According to the first aspect, the second opportunistic resource may be a second opportunity for the uplink data transmission outside of the first period reserved for first transmission opportunities and within the maximum period of time.

According to the first aspect, the second opportunistic resource may be a second opportunity for the uplink data transmission outside of the first period reserved for first transmission opportunities and outside of the maximum period of time.

According to the first aspect, the second opportunistic resource may be a second opportunity for the uplink data transmission, and the method further comprises transmitting the uplink data transmission using the second opportunity for the uplink data transmission upon determining that the frequency channel is not occupied.

According to the first aspect, the second opportunistic resource may be a second opportunity for the uplink data transmission, and the method further comprises determining whether the maximum period of time would be exceeded and selecting, based on the determination, a type of listen-before-talk procedure to be performed before the second opportunity for the uplink data transmission.

According to the first aspect, the first method may further comprise, upon determining that the maximum period of time has been exceeded, performing a first type listen-before-talk procedure on the frequency channel before the second opportunity for the uplink data transmission.

According to the first aspect, the first method may further comprise, upon determining that the maximum period of time would not be exceeded, performing a second type listen-before-talk procedure on the frequency channel before the second opportunity for the uplink data transmission.

According to the first aspect, the first method may further comprise the second opportunistic resource is an opportunity for a downlink transmission, and the method further comprises, upon detecting that the frequency channel is occupied at the beginning of the first opportunity for the uplink data transmission, determining the opportunity for the downlink transmission.

According to the first aspect, the opportunity for the downlink transmission may be within, or at least partially overlapping with, the first opportunity for the uplink data transmission.

According to the first aspect, the opportunity for the downlink transmission may be within a second period reserved for first transmission opportunities, wherein the second period reserved for first transmission opportunities is subsequent to the first period reserved for first transmission opportunities.

According to the first aspect, the first method may further comprise, upon detecting that the frequency channel is occupied at the beginning of the first opportunity for the uplink data transmission, starting monitoring the frequency channel for a downlink control channel.

According to the first aspect, the first method may further comprise receiving the downlink transmission using the opportunity for the downlink transmission.

According to the first aspect, the determining that the frequency channel is occupied may comprise using a listen-before-talk procedure.

According to a second aspect, there is provided a second method comprising providing, to at least one cellular wireless device, a first opportunity for an uplink data transmission on an unlicensed frequency band, wherein the first opportunity is within a first period reserved for first transmission opportunities on a frequency channel, upon detecting at a beginning of the first opportunity that there is no uplink data transmission, determining a second opportunistic resource for the uplink data transmission or a downlink transmission and receiving or transmitting using the second opportunistic resource.

According to the second aspect, the second method may further comprise acquiring the first period reserved for first transmission opportunities upon detecting that the frequency channel is not occupied.

According to the second aspect, the second opportunistic resource may be a second resource for the uplink data transmission and a difference in time between the first and the second opportunity is at least as long as a slot.

According to the second aspect, the second method may further comprise determining a maximum period of time, wherein the maximum period of time is equal to, or larger than, the first period reserved for first transmission opportunities.

According to the second aspect, the second method may further comprise the second opportunistic resource may be a second resource for the uplink data transmission outside of the first period reserved for first transmission opportunities and within the maximum period of time.

According to the second aspect, the second opportunistic resource may be a second resource for the uplink data transmission outside of the first period reserved for first transmission opportunities and outside of the maximum period of time.

According to the second aspect, the second method may further comprise receiving the uplink data transmission using the second opportunity for the uplink data transmission.

According to the second aspect, the second opportunistic resource may be an opportunity for a downlink transmission, and the method further comprises, upon detecting at a beginning of the first opportunity that there is no uplink data transmission, determining the opportunity for the downlink transmission.

According to the second aspect, the opportunity for the downlink transmission may be within, or at least partially overlapping with, the first opportunity for the uplink data transmission.

According to the second aspect, the second method may further comprise determining that the ending time of the maximum period of time is later than, larger than or equal to the ending time of the first period reserved for first transmission opportunities According to the second aspect, the opportunity for the downlink transmission may be within a second period reserved for first transmission opportunities, wherein the second period reserved for first transmission opportunities is subsequent to the first period reserved for first transmission opportunities.

According to the second aspect, the second method may further comprise transmitting the downlink transmission using the opportunity for the downlink transmission upon determining that the frequency channel is not occupied.

According to the second aspect, the frequency channel may be determined as not occupied using a listen-before-talk procedure.

According to the first or the second aspect, the uplink data transmission may comprise at least a Physical Uplink Shared Channel, PUSCH, transmission or a long PUSCH.

According to the first or the second aspect, the uplink data transmission may comprise a short Physical Uplink Control Channel, PUCCH, preceding the PUSCH transmission or the long PUSCH.

According to the first or the second aspect, the second opportunistic resource may be switched on or off, or enabled or disabled, by means of dedicated Downlink Control Information, DCI, and/or group common DCI and/or cell common DCI.

According to a third aspect of the present invention, there is provided an apparatus comprising at least one processing core, at least one memory including computer program code, the at least one memory and the computer program code being configured to, with the at least one processing core, cause the apparatus at least to perform the first method.

According to a fourth aspect of the present invention, there is provided an apparatus comprising at least one processing core, at least one memory including computer program code, the at least one memory and the computer program code being configured to, with the at least one processing core, cause the apparatus at least to perform the second method.

According to a fifth aspect of the present invention, there is provided an apparatus comprising means for performing the first method. According to a sixth aspect of the present invention, there is provided an apparatus comprising means for performing the second method.

According to a seventh aspect of the present invention, there is provided non-transitory computer readable medium having stored thereon a set of computer readable instructions that, when executed by at least one processor, cause an apparatus to at least perform the first method. According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

EMBODIMENTS

Operation of cellular communication networks on unlicensed frequency bands may be improved by the procedures described herein. More specifically, resource usage of cellular communication networks may be enhanced on such frequency bands. A cellular wireless device may have a first opportunity for an uplink data transmission on a frequency channel, but the cellular wireless device may not be able to transmit using the first opportunity if the frequency channel is determined as occupied. In such a case, a second opportunity for the uplink data transmission may be determined, wherein a difference in time between the first and the second opportunity for the uplink data transmission is at least as long as a slot. Alternatively, or in addition, the first and/or the second opportunity for the uplink data transmission may be exploited for downlink transmission in some cases. Thus, resource usage may be improved if the cellular wireless device determines that the frequency channel is occupied at a beginning of a scheduled uplink data transmission.

Figure 1:
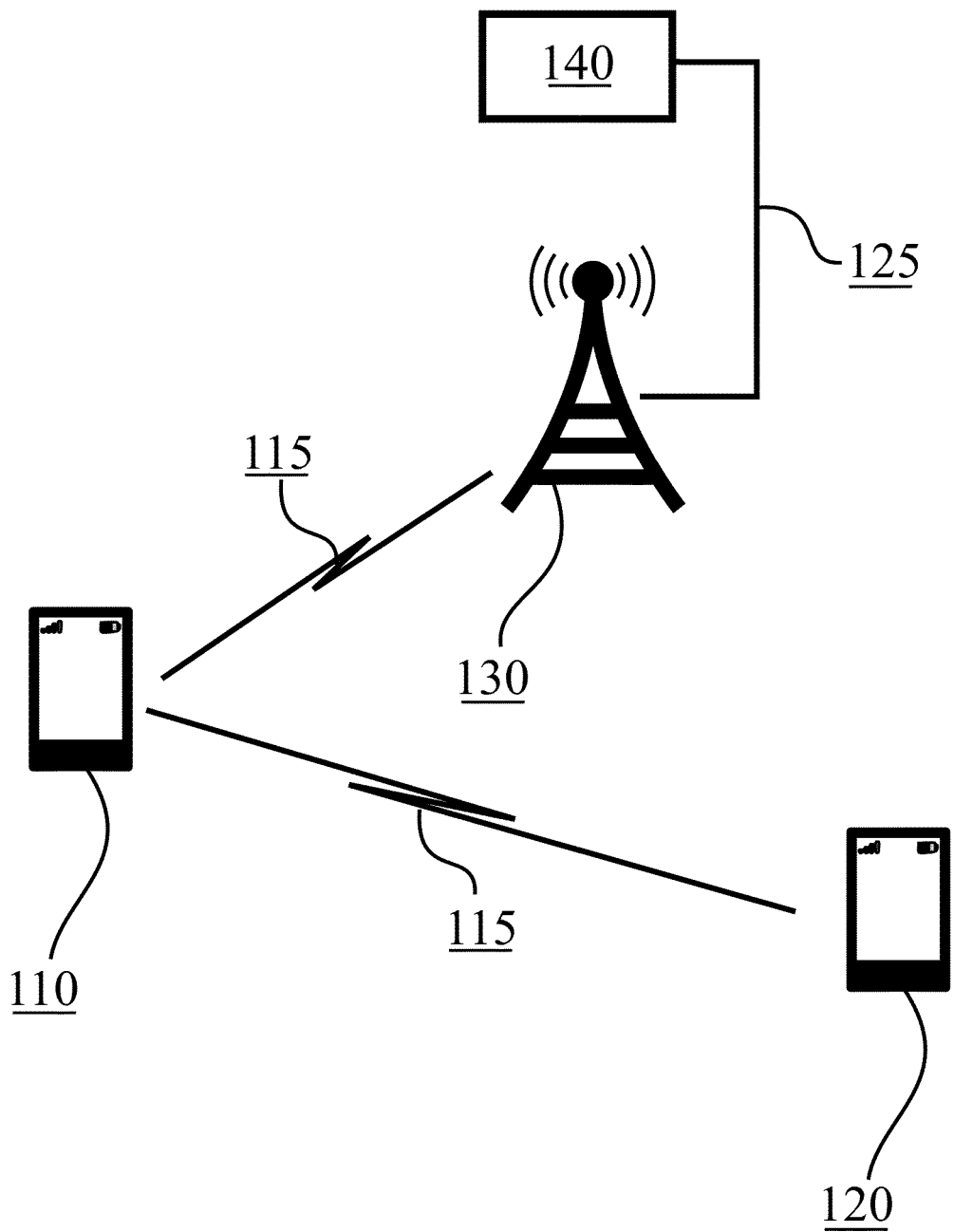
FIG. 1 illustrates an exemplary network scenario in accordance with at least some embodiments.

FIG. 1 illustrates an exemplary network scenario in accordance with at least some embodiments. According to the example scenario of FIG. 1, there may be a cellular wireless communication system operating on unlicensed spectrum. The cellular wireless communication system may comprise at least one first User Equipment, UE, 110, at least one second UE 120, one or more Base Stations, BSs, 130, and core network element 140. UE 110 may be connected to BS 130 via air interface 115 while UE 120 may be in the vicinity of UE 110, even though BS 130 would not hear UE 120. Thus, UE 110 may encounter interference from UE 120 over air interface 115, even though BS 130 would not encounter interference from UE 120 over air interface 115. Such a scenario may be referred to as a hidden node problem. The hidden node for BS 130 may be UE 120 in the example of FIG. 1.

UE 110 may comprise a hardware for carrying out embodiments of the present invention. The same hardware may support also simultaneous operation on licensed and unlicensed bands. Similarly, BS 130 also may comprise a hardware for carrying out embodiments of the present invention and same hardware may support also simultaneous operation on licensed and unlicensed bands. Simultaneous operation may be done, e.g., by means of carrier aggregation and/or dual connectivity. Carrier aggregation framework may include also an opportunity for unlicensed band usage based on supplementary UL functionality defined at least in NR Rel-15.

UEs 110 and 120 may comprise, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable wireless cellular device. Mobile terminal part of a relay node may also be seen as a type of UE relevant at least for some embodiments of the present invention, i.e., the mobile terminal part of the relay node may be referred to as UE or cellular wireless device according to some embodiments of the present invention. In the example system of FIG. 1, UE 110 may communicate wirelessly with a cell of Base Station, BS, 130 via air interface 115. BS 130 may be considered as a serving BS for UE 110.

Air interface between UE 110 and BS 130 may be configured in accordance with a Radio Access Technology, RAT, which both UE 110 and base station 130 are configured to support. Moreover, UEs 110 and 120 may also communicate over air interface 115 in accordance with said RAT or some other RAT. In some embodiments UE 120 may interfere reception of signals at UE 110. Transmission from UE 110 to BS 130 may be referred to as an Uplink, UL, or reverse link and transmission from BS 130 to UE 110 may be referred to as a Downlink, DL, transmission or forward link.

Air interface 115 may be unlicensed spectrum, i.e., air interface 115 may comprise an unlicensed frequency band that UE 110 and BS 130 may use for communication. The unlicensed frequency band may further comprise a frequency channel. The frequency channel may comprise, e.g., one or multiple sub-bands. A size of a sub-band may be predefined, for example 20 MHz. UE 110 and 130 may use a Listen-Before-Talk, LBT, procedure to determine whether the frequency channel on the unlicensed frequency band is occupied, or not, before transmissions.

Examples of cellular RATs include Long Term Evolution, LTE, New Radio, NR, which may also be known as fifth generation, 5G, radio access technology and MulteFire. For example, in the context of LTE, BS 130 may be referred to as eNB while in the context of NR, BS 130 may be referred to as gNB. In general, BS 130 may be referred to as a cellular base station. Thus, BS and gNB may be used as synonyms. Base station part of the relay node may be seen as a type of BS (or gNB) relevant at least for some embodiments of the present invention. Depending on the relaying architecture, BS functionalities at the relay node may be carried out by a Distributed Unit, DU. Also, according to some embodiments, functions of BS 130, i.e., gNB, may be distributed between transmit and receive points, i.e., using a Coordinated Multi Point, CoMP, type of approach. Thus, the base station part of the relay node, a DU, or the transmit point and receive point may be referred to as a cellular base station according to some embodiments of the present invention.

UEs 110 and 120 may be similarly referred to as cellular wireless devices in general. In any case, embodiments are not restricted to any particular cellular communication technology. Instead, embodiments may be exploited in any cellular communication network operating on unlicensed spectrum.

BS 130 may be connected, directly or via at least one intermediate node, with core network 140 via interface 125. Core network 140 may be, in turn, coupled via an interface with another network (not shown in FIG. 1), via which connectivity to further networks may be obtained, for example via a worldwide interconnection network. BS 130 may be connected with at least one other BS as well via an inter-base station interface (not shown in FIG. 1), even though in some embodiments the inter-base station interface may be absent.

In general, according to some embodiments, LBT procedures may be used for determining whether a frequency channel is occupied or not. For example, two LBT procedures may be defined for uplink in accordance with LTE Licensed Assisted Access, LAA, e.g., according to LBT categorization in Version 13.0.0 of the 3GPP TR36.889 specification or Version 15.1.0 of the 3GPP TS 37.213 specification. A first type LBT may be referred to as Type 1, i.e., a variant of Cat 4 energy detection LBT procedure. A second type LBT may be referred to as Type 2, i.e., a variant of Category 2 energy detection LBT procedure.

According to Type 1 LBT, a UE (or gNB) may generate a random number N uniformly distributed over a contention window, wherein a size of the contention window may depend on a channel access priority class of traffic. The UE (or gNB) may also measure a frequency channel and once the UE has measured the frequency channel to be vacant for N times, the UE may occupy the frequency channel with an uplink (or DL) data transmission. To align the uplink data transmission with a LTE subframe boundary, the UE may need to resort to self-deferral during the LBT procedure.

According to Type 2 LBT, a UE (or gNB) may perform single channel measurement in time interval of, e.g., 25 μs before Uplink, UL, (or Downlink) transmission. For a Physical Uplink Shared Channel, PUSCH, this type of LBT may be performed when a BS shares its Channel Occupancy Time, COT, with the UE. In other words, the BS may have contended for the channel using Cat 4 LBT and once the BS has acquired access to the channel, it may allow UEs to use at least a portion of the acquired COT for UL data transmissions.

According to embodiments of the present invention, the COT may be referred to as period reserved, typically acquired by the BS, for transmission opportunities. Said transmission opportunities may be for first uplink and/or downlink transmissions. Maximum COT, MCOT, may refer to a maximum period of time for which a frequency channel on unlicensed spectrum can be reserved by a cellular base station. MCOT may as long as COT, i.e., the maximum period of time may be equal to, or larger than, the first period reserved for first transmission opportunities. When MCOT is exceeded, the BS may need to perform Type 1 LBT again in order to transmit DL data. That is to say, the maximum period of time may refer to a maximum time that the frequency channel may be reserved.

Moreover, an uplink data transmission may be referred to as a PUSCH transmission in some embodiments. Also, an uplink control channel may be referred to a Physical Uplink Control Channel, PUCCH, in some embodiments. In an embodiment, PUCCH may relate to a short PUCCH located after DL portion of the COT. The short PUCCH may be time division multiplexed with PUSCH. In another embodiment, PUCCH may relate to a long PUCCH, which may be frequency division multiplexed with PUSCH. In yet another embodiment, Uplink Control Information, UCI, may be multiplexed with UL data on PUSCH.

That is to say, the PUSCH transmission and PUCCH are used as examples in some embodiments, but the present invention is not limited to any specific names of the channels. Similarly, Physical Downlink Shared Channels, PDSCH, and Physical Downlink Control Channel, PDCCH, may be in general referred to as downlink data transmission and downlink control channel, respectively.

In some embodiments, it may be beneficial to support UL data transmission with Type 2 LBT within a COT, possibly acquired by the BS, because Type 2 LBT with predetermined LBT procedure duration efficiently supports scheduled uplink data transmissions as well as uplink Frequency Division Multiple Access, FDMA.

As an example, the COT acquired by the BS may contain a DL portion and at most one UL portion. For instance, in case of LTE LAA and Multefire, the COT acquired by the BS may contain a DL portion and at most one UL portion. However, multiple switching points between UL and DL transmission may be supported within the COT, e.g., when the COT is acquired by the BS. In these cases, a first LBT done by the BS may be based on Type 1 LBT, whereas other LBTs within the COT, performed by the UE and/or by the BS, may be based on Type 2 LBT or no LBT. The no LBT option may be applicable to transmission starting within 16 us after the end of preceding transmission. In an embodiment, "No-LBT" option may be applicable to short PUCCH only.

Figure 2:
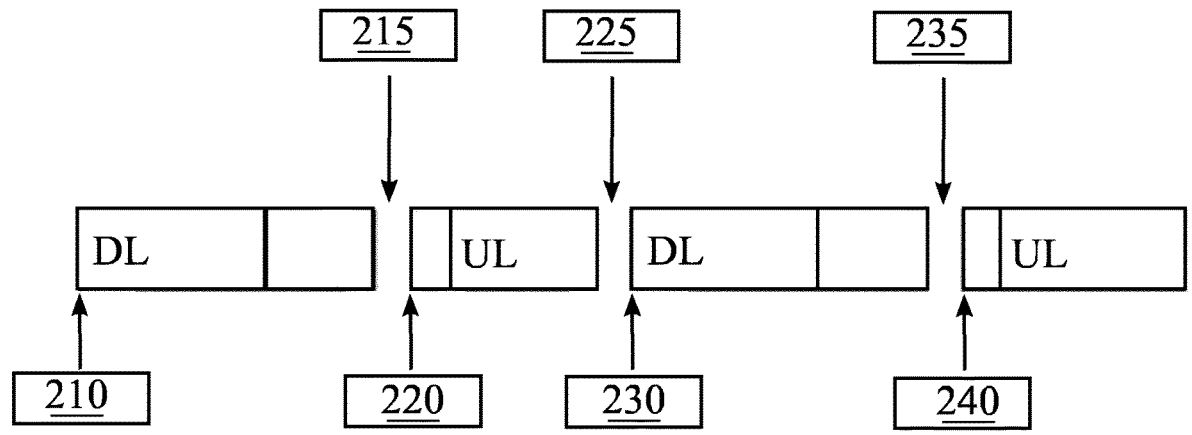
FIG. 2 illustrates an example of multiple switching points in accordance with at least some embodiments.

FIG. 2 illustrates an example of multiple switching points in accordance with at least some embodiments. In the example of FIG. 2, occupancy of a frequency channel may be detected using a LBT procedure. Thus, in the example of FIG. 2, a first LBT is denoted by 210, second LBT is denoted by 220, third LBT is denoted by 230 and fourth LBT is denoted by 240. Moreover, a first switching point is denoted by 215, second switching point is denoted by 225 and third switching point is denoted by 235.

Switching points 215, 225 and 235 may indicate a change of a transmission direction within a COT. For example, switching point 215 may be between a first DL and a first UL data transmission, switching point 225 may be between the first UL and a second DL data transmission and switching point 235 may be between the second DL transmission and a second UL data transmissions. In some embodiments, UL and DL data transmissions may be referred to as PUSCH and PDSCH transmissions, respectively. However, in some embodiments PUSCH may cover also cases with short PUCCH and/or long PUSCH. In addition, in some embodiments PDSCH may cover also PDCCH.

Support for multiple switching points may provide, e.g., improved latency performance without increasing the overhead of frequent LBT procedures, e.g., Type 1 LBT, too much. From a Hybrid Automatic Repeat Request, HARQ, and/or scheduling point of view, it may not be a problem to support a COT with multiple switching points. For example, similar functionality may be supported for NR licensed band operation as well.

Multiple switching points within a COT may need to be taken into account in channel access procedures. The length of a switching gap between different link directions may need to be considered as well.

For instance, a BS may perform a first LBT procedure at time instant 210. Time instant 210 may also refer to a beginning of the COT. The first LBT procedure at time instant 210 may be a Type 1 LBT procedure, i.e., a first type LBT procedure. A first DL data transmission may take place upon detecting that the frequency channel is not occupied at time instant 210.

Moreover, a UE may perform a second LBT procedure at time instant 220. Time instant 220 may also refer to a beginning of a first scheduled UL data transmission, such as, a first PUSCH transmission scheduled by the BS. The second LBT procedure at time instant 210 may be a Type 2 LBT procedure, i.e., a second type LBT procedure. A first UL data transmission may take place upon detecting that the frequency channel is not occupied at time instant 220.

In the example of FIG. 2, the BS may also perform a third LBT procedure at time instant 230. However, in some embodiments, the third LBT procedure at time instant 230 may not be needed as the BS has performed the first LBT procedure already. If performed, the third LBT procedure may be the second type LBT procedure as well. A second DL data transmission may take place upon detecting that the frequency channel is not occupied at time instant 230.

The UE may perform a fourth LBT procedure at time instant 240. However, in some embodiments, the fourth LBT procedure at time instant 240 may not be needed. If performed, the fourth LBT procedure may be the second type LBT procedure as well. A second UL data transmission, such as, a second PUSCH transmission scheduled by the BS, may take place upon detecting that the frequency channel is not occupied at time instant 240.

The COT may be acquired by the BS and hence it may be possible that even though the BS would determine the frequency channel as not occupied, i.e., free, the UE may encounter interference from an adjacent wireless node. The adjacent node may be, e.g., an access point of Wireless Local Area Network, WLAN, mobile station of WLAN, another UE or any kind of device transmitting on the frequency channel in general. For example, with reference to FIG. 1, UE 110 may encounter interference from UE 120, even though BS 130 would not encounter interference from UE 120.

An issue hence may be that, with reference to FIG. 2 again, the first LBT procedure at time instant 210 may succeed, i.e., the frequency channel may be determined as not occupied by the BS, but the second LBT procedure at time instant 220 may not succeed, i.e., the frequency channel may be determined as occupied by the UE due to a transmission of the adjacent wireless node. Consequently, the UE would not be able to transmit on the frequency channel, even though the BS would have scheduled an UL data transmission for the UE on the frequency channel. Multiple UEs may naturally face the same issue. On the other hand, the hidden node problem may relate to certain UEs only.

The issue may be present for example in dense network deployments. For example, a dense deployment of a NR-Unlicensed, NR-U, network may cause the issue. A situation may be even worse in cases wherein at least one WLAN, i.e., Wi-Fi, system is deployed on the same frequency channel. Also, increased traffic loads on the frequency channel may affect the situation. Therefore, in some situations LBT blocking may be a challenge for scheduled UL data transmissions and deteriorate a performance of a cellular communication network on unlicensed spectrum, e.g., a performance of NR-U networks may be deteriorated. LBT blocking may refer to a situation, wherein a frequency channel is determined as occupied repeatedly.

Moreover, in some situations the UE may be in a challenging location, wherein the hidden node problem is severe. For example, the challenging location may refer to a location, wherein there are many interferers close to the UE but the BS is not aware of the interferers. UL data transmissions of the UE may be therefore repeatedly blocked, which would cause a significant decrease in link throughput and also increase latency due to LBT blocking. Consequently, there is a need for enabling acquisition of the frequency channel for a UL data transmission also later than at a time of the initially scheduled first opportunity for the UL data transmission.

One solution may be to schedule, by the BS, a retransmission opportunity for the UE if the scheduled UL data transmission cannot be performed, i.e., if the UE determines the frequency channel as occupied before the scheduled UL data transmission. However, such a solution may increase latency and reserve resources for nothing. Also, the UL data transmission, i.e., PUSCH transmission, may need to be performed in a subsequent, i.e., different, COT as a result of the scheduling of the retransmission opportunity.

Another solution may be to schedule, by the BS, multiple starting positions, i.e., opportunities for a UL data transmission of the UE. Said multiple starting positions may be located within a slot, but in such a case time window during which the multiple opportunities take place may be rather short. Thus, it is likely that an interference situation of the UE remains the same between said multiple opportunities for the UL data transmission. Consequently, a minor improvement for LBT success may be provided, if any. LBT success may refer to determining that a frequency channel is not occupied, which would enable gaining access to the frequency channel and starting a transmission. On the other hand, the use of multiple starting points within a slot does not work well with Frequency Division Multiple Access, FDMA, of UEs, because if any of the UEs gains channel access, it will likely block other UEs on later LBT attempts, significantly further reducing the benefit from multiple starting points.

Multiple opportunities for the UL data transmission within a slot may be a suitable solution for operation outside the COT acquired by the BS. That is to say, multiple opportunities for the UL data transmission may be a suitable solution for a configured grant type of operation where UE autonomously, without BS scheduling, starts UL transmission on periodic resources configured to the UE (and where the transmission may cover the entire frequency band/sub-band). However, wide use of configured grant operation may hinder BS when acquiring channel access for COT.

Embodiments of the present invention therefore provide an improved solution for a cellular communication system operating on unlicensed spectrum, wherein multiple opportunities for an UL data transmission, such as PUSCH transmission, may be enabled while also improving robustness of the cellular communication system against LBT blocking.

Moreover, embodiments of the present invention increase a success rate of a UL data transmission by providing a second opportunity for the UL data transmission, wherein there is a sufficient difference in time between a first opportunity for the UL data transmission and the second opportunity for the UL data transmission, thereby reducing the likelihood that an interference situation of the UE would remain the same between the first and the second opportunities for the UL data transmission. In some embodiments, the second opportunity for the UL data transmission may be referred to as a second opportunistic resource. In some embodiments, there may be a third opportunity for the UL data transmission or any other number as well.

For example, a difference in time between the first and the second opportunity for the uplink data transmission may be at least as long as a slot. The difference in time may also refer to a difference in time between a beginning of the first opportunity and a beginning of the second opportunity. A configuration for (the first and) the second opportunities may be configured, i.e., scheduled, by the BS and transmitted to the UE. Consequently, the UE may obtain and determine the first and the second opportunities, i.e., configurations of the first and the second opportunities, based on the received information.

In some embodiments, the first opportunity for the uplink data transmission may need to be scheduled in any case but the second opportunity for the uplink data transmission may not be available always. The second opportunity for the uplink data transmission may be triggered by the BS. In some embodiments, time domain resources for the first opportunity for the uplink data transmission may be at a position indicated in the UL grant but time domain resources for the second opportunity for the uplink data transmission may not be at a fixed position relative to the first opportunity position, or determined with a predetermined, e.g., Radio Resource Control, RRC, configured, time offset relative to the first opportunity position. The BS may indicate the time domain resources for the second opportunity separately from the time domain resources for the first opportunity for the uplink data transmission. The time domain resource for the second opportunity may be indicated by means of GC-PDCCH, for example, or with a separate indication in the UL grant scheduling the first opportunity.

Furthermore, embodiments of the present invention also minimize overhead caused by the second opportunity for the UL data transmission by providing a way for BS to utilize unused opportunities, which are initially scheduled for UL data transmissions, for DL data transmissions.

Figure 3:
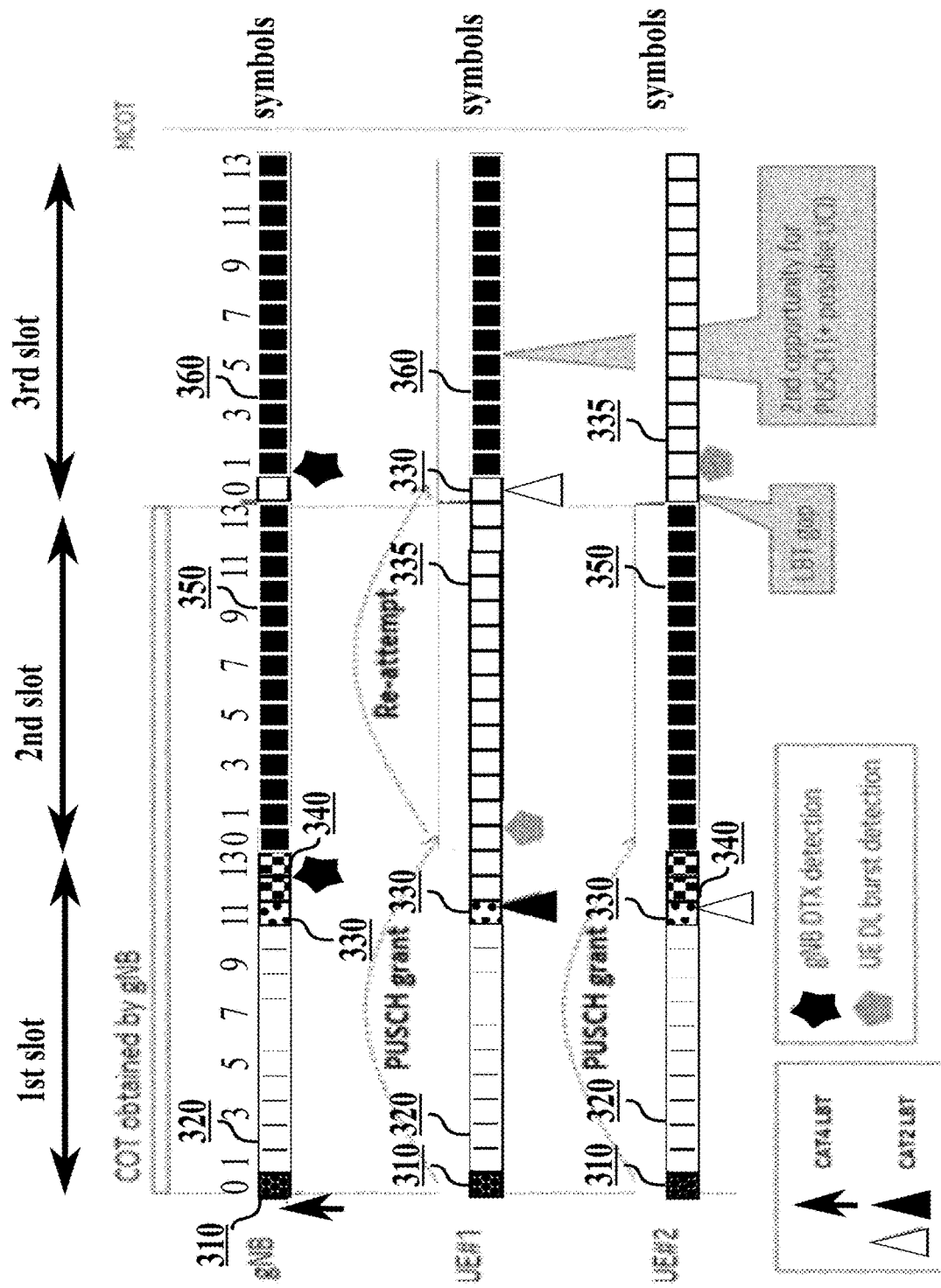
FIG. 3 illustrates a first example in accordance with at least some embodiments.

FIG. 3 illustrates a first example in accordance with at least some embodiments. In FIG. 3, a transmission of a DL control channel by a BS, e.g., PDCCH, is denoted by 310. UE #1 and UE #2 may receive the transmission of the DL control channel. The transmission may comprise a PUSCH grant at symbol 0 of a first slot of the COT obtained by gNB. The PUSCH grant may indicate a configuration for a scheduled PUSCH transmission 350, e.g., the configuration may be for a second slot of the COT obtained by the gNB. The scheduled PUSCH transmission may be referred to as a first opportunity for a UL data transmission.

According to the first example, there may be an additional, second opportunity 360 for a PUSCH transmission after the end of the COT as indicated by the gNB, i.e, last scheduled DL or UL slot, but within MCOT. As shown in FIG. 3, a difference in time between the first 350 and the second opportunity 360 for the UL data transmission may be equal, or longer, than a slot. Also, a second opportunistic resource may refer to the second opportunity 360 for the UL data transmission.

Moreover, DL data transmission, such as PDSCH transmission, is denoted by 320. Transmission of DL data may start at symbol 1 of the first slot and end at symbol 10 of the first slot according to the example of FIG. 3. A guard period is denoted by 330. A period wherein there is no transmission is denoted by 335. In essence, guard period 330 and a period wherein there is no transmission 335 are the same. For example, UE #1 does not transmit at symbols 11-13 of the first slot of the COT and symbols 0-13 of the second of the COT. Also, gNB and UE #2 do not transmit during symbol 11 of the first COT.

Transmission of UL control channel, such as, PUCCH, is denoted by 340 in FIG. 3. Thus, UE #2 may transmit UL control channel at symbols 12 and 13 of the first slot of the COT and gNB may receive the UL control channel at symbols 12 and 13 of the COT. UE #2 may, at symbol 11 of the first slot of the COT, perform monitoring of the frequency channel before transmission of the UL control channel and determine that the frequency channel is not occupied, denoted with a white triangle in FIG. 3. The monitoring may comprise using a LBT procedure, such as, second type of LBT, i.e., Cat 2 LBT. Also, UE #1 may, at symbol 11 of the first slot of the COT, perform monitoring of the frequency channel before transmission of the UL control channel and determine that the frequency channel is occupied, denoted with a black triangle in FIG. 3. That is to say, a successful LBT is denoted with a white triangle while an unsuccessful LBT (Type 2) is denoted with a black triangle.

In addition, the gNB may perform Discontinuous Transmission, DTX, detection at symbols 12-13 of the first slot of the COT and UE #1 may start performing DL burst detection at symbol 0 of the second slot of the COT. A first opportunity for a PUSCH transmission is denoted by 350 in FIG. 3. Thus, UE #2 may perform the PUSCH transmission using the first opportunity and the gNB may receive it at symbols 0-13 of the second slot of the COT. Moreover, a second opportunity for the PUSCH transmission is denoted by 360. Thus, UE #1 may perform the PUSCH transmission and the gNB may receive it at symbols 1-13 of the third slot, wherein the third slot is outside of the COT and within MCOT.

Hence, in the first example in FIG. 3 an additional, i.e., second opportunity for PUSCH transmission is provided after an end of the COT as indicated by the gNB. The end of the COT may refer to a last DL or UL slot which has been scheduled by the gNB and indicated to UE #1 and UE #2 using the DL control channel 310. The second opportunity may be within the MCOT according to the first example.

In the first example of FIG. 3 the COT may be acquired by the gNB and the COT may be shared between gNB, UE #1 and UE #2. A PUSCH transmission may require a successful LBT, such as, second type of LBT, i.e., Cat 2 LBT before the PUSCH transmission and/or PUCCH transmission.

According to the example of FIG. 3, the LBT procedure performed by UE #1 was not successful, i.e., UE #1 determined the frequency channel as occupied at symbol 11 of the first slot. Therefore, even though UE #1 was scheduled by the gNB for a PUSCH transmission at symbols 0-13 of the second slot, UE #1 would not be able to use the scheduled PUSCH transmission, i.e., the first opportunity for the PUSCH transmission. That is to say, UE #1 cannot exploit the first opportunity for the PUSCH transmission while UE #2 may transmit using the first opportunity for the PUSCH transmission.

Hence, a second opportunity 360 for the PUSCH transmission is provided for UE #1. The second opportunity may be for any other scheduled UE as well. In some embodiments, the second opportunity may be used for transmitting an UL control signal, such as, PUCCH (e.g. short PUCCH), as well.

In some embodiments, the second opportunity 360 may be provided for N consecutive slots/mini-slots corresponding to N HARQ processes. Alternatively, N transmission opportunities may be provided in N consecutive slot/mini-slots for a single HARQ process.

As an example, N may be determined based on a difference in time between the end of COT, e.g. the last scheduled slot, and an ending time of the MCOT. In some embodiments, N may be upper limited by $N_{Max}$, which may be determined by higher layer configuration.

The second opportunity for the PUSCH transmission may be located after the COT (or last scheduled slot), e.g., immediately after the COT, but within the MCOT. The UE may determine the ending time for the COT, the ending time of the MCOT, and a time for UE LBT from a cell or group common Downlink Control Information, DCI. The cell or group common DCI, such as, DCI format 2_0, may indicate the COT structure.

The second opportunity for the PUSCH transmission may not be always present though. Dedicated DCI (such as UL grant) and/or cell or group common DCI, such as DCI 2_0, may contain an indicator indicating an availability of the second opportunity, as well as the number of additional opportunities within the MCOT. As an example, the second opportunity for the PUSCH transmission may not be available if a time difference between the ending time of the COT and the ending time of the MCOT is smaller than a predefined value, e.g. less than one slot.

With reference to FIG. 3 again, UE #1 may perform monitoring of the frequency channel using first type LBT, i.e., Cat2 LBT, at a predefined time after the indicated COT. The predefined time may be, for example, symbol k+1, wherein k may refer to a last OFDM symbol of the COT, e.g., symbol 13 of the second slot.

If UE #1 determines the frequency channel as free at symbol 0 of a third slot, i.e., the slot after the COT but within the MCOT, UE #1 may transmit a PUSCH transmission at the second opportunity 360 for the PUSCH transmission, i.e., at symbols 1-13 of the third slot. In addition, UE #1 may also transmit a possible PUCCH transmission, comprising Uplink Control Information, UCI, using the second opportunity 360.

However, if UE #1 determines the frequency channel as occupied at symbol 0 of the third slot, UE #1 may start a DL burst detection because UE #1 cannot use the second opportunity 360 for transmitting the PUSCH transmission in that case. This means that UE #1 is ready for PDCCH/PDSCH reception even though it has a valid UL grant for the second opportunity 360.

In some embodiments, the second opportunity 360 for the PUSCH transmission may follow the original PUSCH resource allocation grant, except for the timing. The original PUSCH may refer to the first opportunity 350 for the PUSCH transmission. For example, Physical Resource Block, PRB, allocation, HARQ Incremental Redundancy, HARQ-IR, Modulation and Coding Set, MCS, New Data Indicator, NDI, and Redundancy Version, RV, may be the same as in the original PUSCH transmission that was blocked because of LBT.

As shown in FIG. 3, there may be a LBT gap in the beginning of the third slot. During the LBT gap, UE #1, UE #2 and gNB may refrain from transmitting and instead listen to the frequency channel according to a LBT procedure.

A duration of the PUSCH transmission may vary slightly between the first opportunity 350 for the PUSCH transmission and the second opportunity 360 for the PUSCH transmission due to the LBT gap. Depending on the ending time of the COT, the UE may need to puncture, or rate match a transport block around the LBT gap for the second opportunity 360 for the PUSCH transmission.

Figure 4:
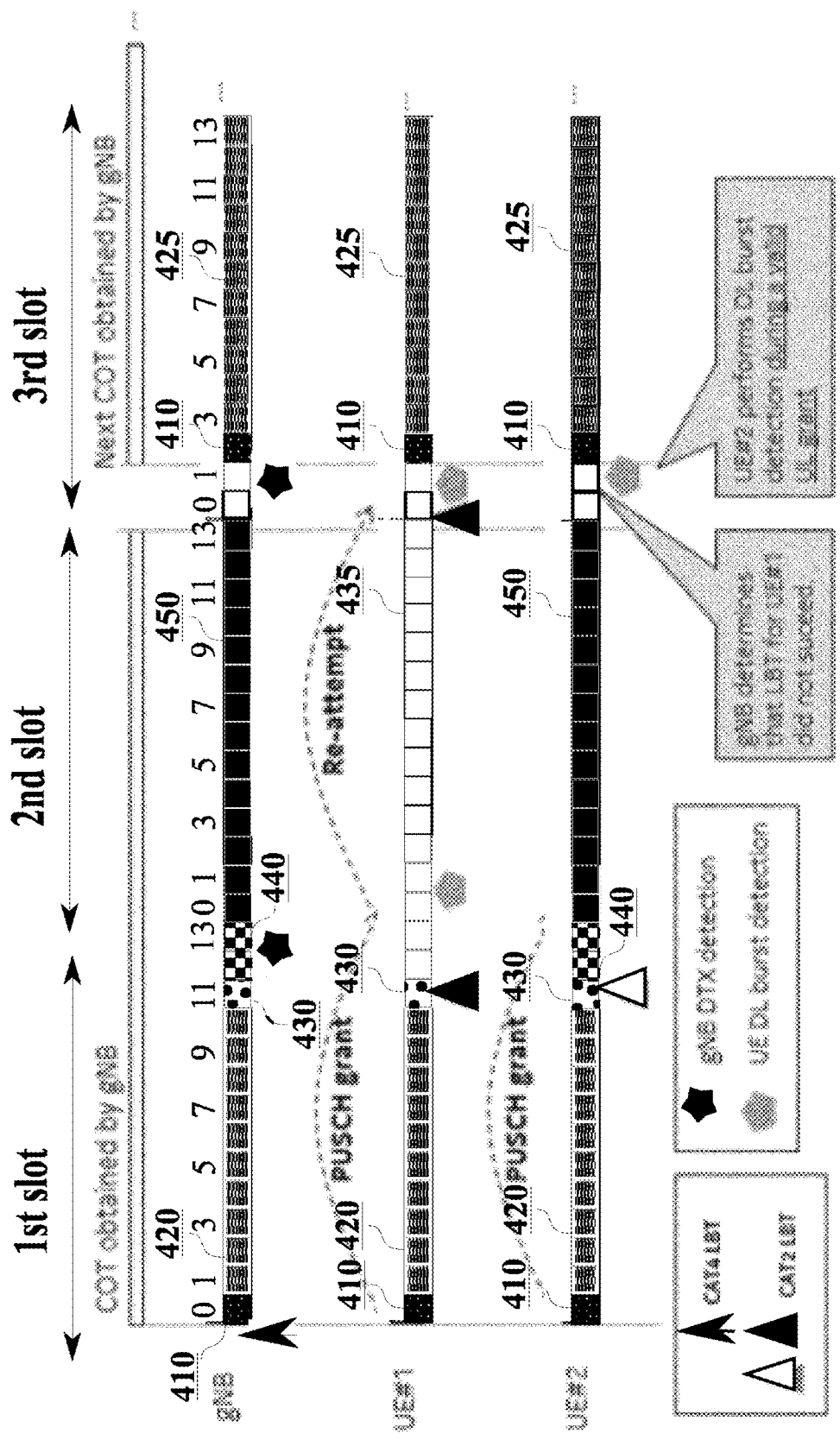
FIG. 4 illustrates a second example in accordance with at least some embodiments.

FIG. 4 illustrates a second example in accordance with at least some embodiments. With reference to FIG. 3, DL control channel 410 may correspond to DL control channel 310, DL data transmission 420 may correspond to DL data transmission 320, guard period 430 may correspond to guard period 330, period wherein there is no transmission 435 may refer to period 335. UL control channel 440 may correspond to UL control channel 340 and DL data transmission 450 may correspond to DL data transmission 350. In addition, an opportunity for a DL transmission is denoted by 425 in FIG. 4. The opportunity for the DL transmission 425 may be referred to as a second opportunistic resource. As shown in FIG. 4, the opportunity for the downlink transmission may be within a second period reserved for first transmission opportunities, i.e., next COT (third slot), wherein the second period reserved for first transmission opportunities is subsequent to the first period reserved for first transmission opportunities, i.e., the COT comprising the first and second slots.

The second example in FIG. 4 demonstrates an opportunity for dynamic link direction change within a COT, in the cases when UL LBT fails. More specifically, the second example shows a change of link direction from UL to DL during the third slot. According to the second example the operation of gNB, UE #1 and UE #2 may be similar compared to the operation of gNB, UE #1 and UE #2 according to the first example, respectively, during slots 1 and 2. However, in the second example there may an additional valid grant for UL data transmission during the next COT, i.e., subsequent COT. For example, the additional valid grant may be related to the third slot within the next COT.

At symbol 0 of the next COT, UE #1 may again determine that the frequency channel is occupied and hence refrain from transmitting the PUSCH transmission in the third slot within the next COT, even though UE #1 would have a valid grant for the third slot. Upon determining that the frequency channel is occupied, UE #1 may start a DL burst detection. Also, gNB may perform DTX detection at that time and infer that UE #1 determined the frequency channel as occupied if there is no transmission from UE #1. In addition, UE #2 may also perform DL burst detection at that time, i.e., during the valid UL grant, even though UE #2 would have performed the PUSCH transmission during the second slot of the COT.

Upon detecting that there is no uplink data transmission, the gNB may perform LBT (e.g. Type 1 LBT) and if the gNB founds channel to be unoccupied, transmit a second DL control channel and subsequently a second DL data transmission using the opportunity for DL data transmission 425.

In other words, the second example illustrates an opportunity for the gNB to re-catch the frequency channel for a DL transmission, if the frequency channel was detected as occupied by UE #1 at the beginning of the second opportunity for the PUSCH transmission.

As shown in FIG. 4, embodiments may comprise gNB UL DTX detection, wherein the gNB may detect that none of the scheduled PUSCH(s) is present, at symbol 1 of the third slot. In addition, gNB may perform LBT, such as, Type 1 (Cat4) LBT and if that's successful, start a new COT. The second example may be particularly beneficial when operating at the end of COT but before the end of MCOT. Different implementation options may be available for gNB UL DTX detection. For example, gNB UL DTX detection may be based on sequence detection based on demodulation reference signal. Additionally, or alternatively, gNB UL DTX detection may be based on energy detection from frequency/time domain resources allocated to PUCCH and/or PUSCH.

Figure 5:
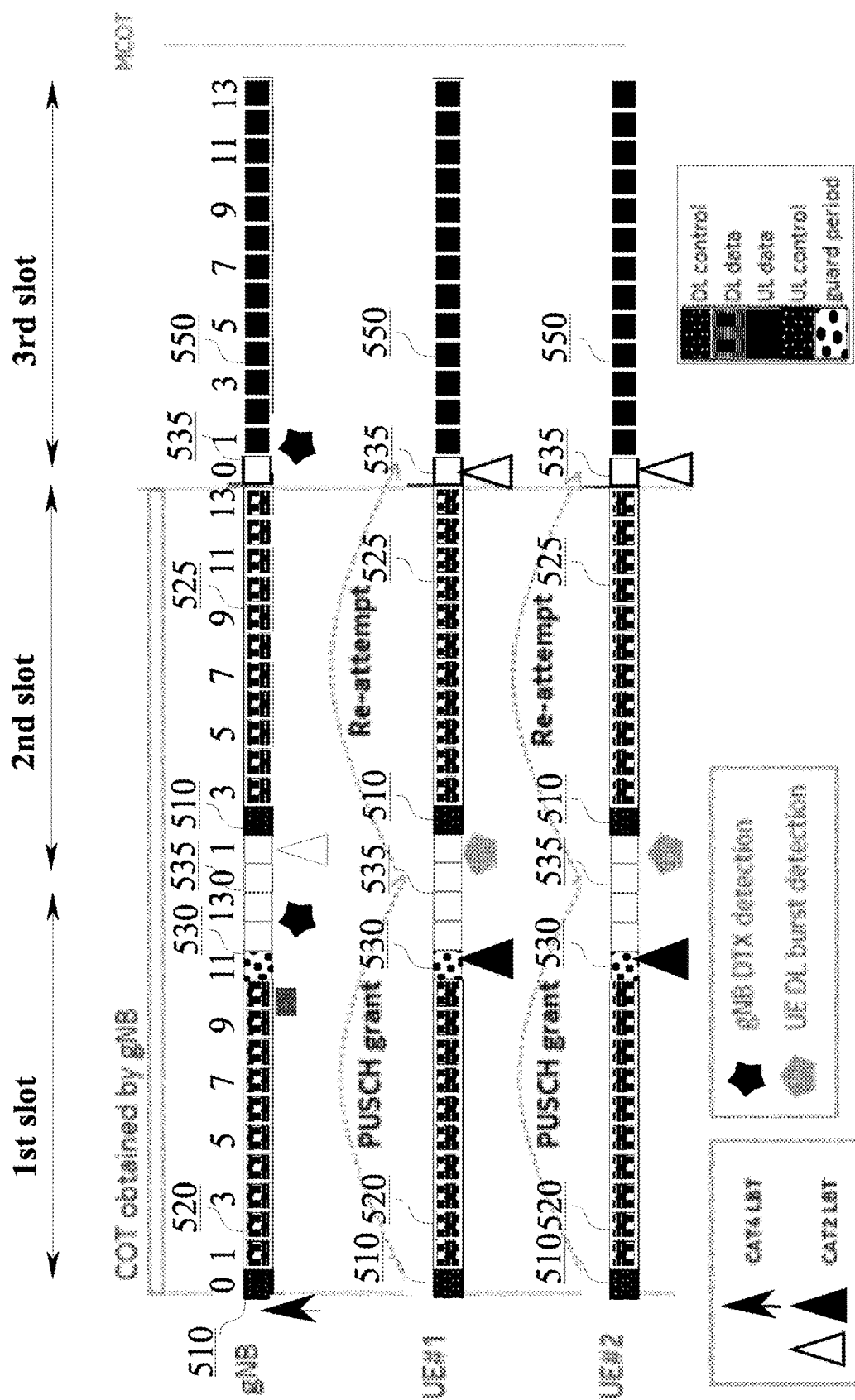
FIG. 5 illustrates a third example in accordance with at least some embodiments.

FIG. 5 illustrates a third example in accordance with at least some embodiments. With reference to FIG. 3, DL control channel 510 may correspond to DL control channel 310, DL data transmission 520 may correspond to DL data transmission 320, guard period 530 may correspond to guard period 330, period wherein there is no transmission 535 may refer to period 335 and DL data transmission 550 may correspond to DL data transmission 350. In addition, with reference to FIG. 4, opportunity for a DL data transmission 525 may refer to opportunity for DL data transmission 425, i.e., to a second opportunistic resource.

The third example in FIG. 5 is similar to the second example of FIG. 5 in a sense that FIG. 5 also demonstrates an opportunity for dynamic link direction change within a COT, in the cases when UL LBT fails.

According to the third example, UE #1 and UE #2, may determine the frequency channel as occupied at symbol 11 of the first slot of the COT, i.e., during guard period 530. Thus, UE #1 and UE #2 would not transmit during the first opportunity for the PUSCH transmission. In such a case, the gNB may re-catch the frequency channel during the first opportunity for the PUSCH transmission and use at least the second slot of the COT, or part of it, for DL data transmission. Thus, the gNB may re-catch the frequency channel during the second slot and, possibly, during at least one other slot, depending on a length of the UL portion. That is to say, the opportunity for a DL data transmission 525 may be within the first opportunity for the PUSCH transmission.

In some embodiments, the gNB may perform monitoring of the frequency channel, e.g., Type 2 Cat2 LBT at symbol 1 of the second slot of the COT. If the gNB determines that the frequency channel is not occupied, the gNB may transmit a second DL control channel 510 at symbol 2 of the second slot of the COT and after continue with DL data transmission 525 until the end of the COT. For this, UE #1 and UE2 may need to perform DL burst detection at symbol 1 of the second slot of the COT. The starting time of the "opportunistic DL portion" may be aligned with PDCCH monitoring occasions defined for UEs at least in the second and third examples of FIGS. 4 and 5, respectively.

The third example may be particularly beneficial when operating in the middle of the COT. According to the third example, the second opportunity for the PUSCH transmission, i.e., a second opportunistic resource, after the end of COT but within the MCOT, may be maintained as in the first example of FIG. 3.

In general, in some embodiments LBT and DTX detection may be done jointly at the gNB. For example, if both, LBT and DTX detection, are based on energy detection only, the same measurement or subset of measurements may be able to perform both.

In general, DL burst detection performed by an UE may mean that when UL LBT is negative, the UE may start DL burst detection already during a valid UL grant. If a DL signal, such as preamble and/or PDCCH DMRS, is detected, a UE may perform PDCCH monitoring according to a predefined PDCCH monitoring configuration. That is to say, the UE may blindly decode, i.e., attempt to receive a DL control channel, such as, PUCCH. In some embodiments, this may be considered as the minimum that the UE would do, even in the case that the gNB fails to transmit DL on the second opportunity for the PUSCH transmission, i.e., if the gNB would fail to transmit using the opportunity for DL data transmission 525 in FIG. 5.

However, it is noted that dynamic link direction change within the COT and/or re-transmission part of the COT may not be always available. Dedicated DCI, such as UL grant and/or cell or group common DCI (such as DCI 2_0), may contain an indicator indicating an availability of dynamic link direction change, possibly within the current COT. This information may also guide UE's PDCCH monitoring.

In addition, in some embodiments the second opportunity for the PUSCH transmission, i.e., for PUSCH re-transmission, may be provided after the end of the COT and also after the end of the MOOT. That is to say, the second opportunity for the PUSCH transmission may be provided outside of the COT and outside of the MOOT. In some embodiments, there may be more than one second opportunity for the PUSCH transmission.

For example, a UE may determine whether the MOOT would be exceeded with the second opportunity for the PUSCH transmission, i.e., one or more PUSCH re-transmission opportunities would be located outside the MOOT. If the UE determines that the MOOT would be exceeded with the second opportunity for the PUSCH transmission, the UE may perform a first type LBT procedure, e.g., Cat4 (Type 1) LBT, before the second opportunity for the PUSCH transmission. On the other hand, if the UE determines that the MOOT would not be exceeded with the second opportunity for the PUSCH transmission, the UE may perform a second type LBT procedure, e.g., Cat2 (Type 2) LBT, before the second opportunity for the PUSCH transmission.

If the channel is found to be free according to LBT, the UE may transmit the scheduled PUSCH(s) and/or PUCCH. Transmission may follow the original PUSCH/PUCCH resource allocation grant, i.e., the first opportunity for the PUSCH/PUCCH transmission, except for the timing. After that UE may continue with performing DL burst detection. However, if the frequency channel is found to be occupied according to LBT UE may continue with performing DL burst detection.

Figure 6:
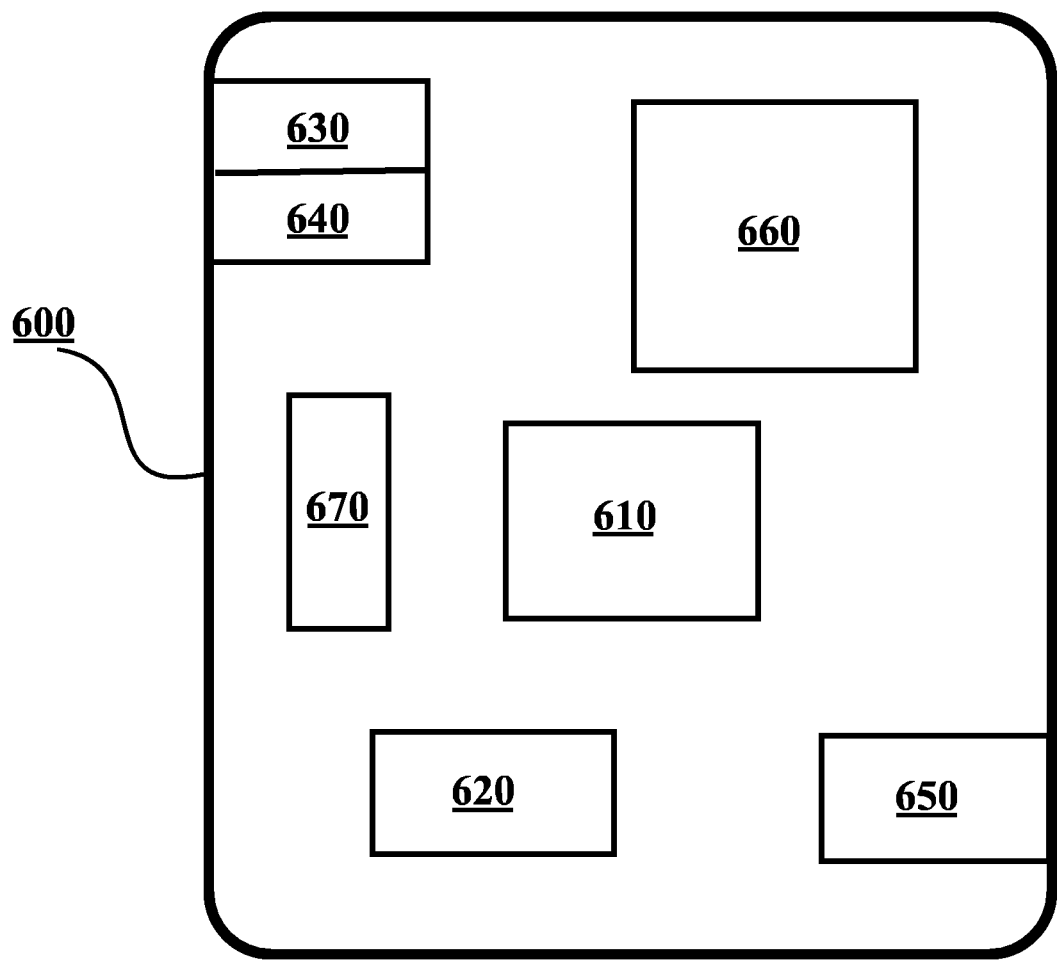
FIG. 6 illustrates an example apparatus capable of supporting at least some embodiments.

FIG. 6 illustrates an example apparatus capable of supporting at least some embodiments. Illustrated is device 600, which may comprise, for example, UEs 110, or cellular wireless terminals in general, or BS 130, or cellular base station in general, of FIG. 1. Comprised in device 600 is processor 610, which may comprise, for example, a single- or multi-core processor wherein a single-core processor comprises one processing core and a multi-core processor comprises more than one processing core. Processor 610 may comprise, in general, a control device. Processor 610 may comprise more than one processor. Processor 610 may be a control device. A processing core may comprise, for example, a Cortex-A8 processing core manufactured by ARM Holdings or a Steamroller processing core produced by Advanced Micro Devices Corporation. Processor 610 may comprise at least one Qualcomm Snapdragon and/or Intel Atom processor. Processor 610 may comprise at least one application-specific integrated circuit, ASIC. Processor 610 may comprise at least one field-programmable gate array, FPGA. Processor 610 may be means for performing method steps in device 600. Processor 610 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular wireless device, or other computing or network device.

Device 600 may comprise memory 620. Memory 620 may comprise random-access memory and/or permanent memory. Memory 620 may comprise at least one RAM chip. Memory 620 may comprise solid-state, magnetic, optical and/or holographic memory, for example. Memory 620 may be at least in part accessible to processor 610. Memory 620 may be at least in part comprised in processor 610. Memory 620 may be means for storing information. Memory 620 may comprise computer instructions that processor 610 is configured to execute. When computer instructions configured to cause processor 610 to perform certain actions are stored in memory 620, and device 600 overall is configured to run under the direction of processor 610 using computer instructions from memory 620, processor 610 and/or its at least one processing core may be considered to be configured to perform said certain actions. Memory 620 may be at least in part comprised in processor 610. Memory 620 may be at least in part external to device 600 but accessible to device 600.

Device 600 may comprise a transmitter 630. Device 600 may comprise a receiver 640. Transmitter 630 and receiver 640 may be configured to transmit and receive, respectively, information in accordance with at least one cellular or non-cellular standard. Transmitter 630 may comprise more than one transmitter. Receiver 640 may comprise more than one receiver. Transmitter 630 and/or receiver 640 may be configured to operate in accordance with Global System for Mobile communication, GSM, Wideband Code Division Multiple Access, WCDMA, 5G, Long Term Evolution, LTE, IS-95, Wireless Local Area Network, WLAN, Ethernet and/or Worldwide Interoperability for Microwave Access, WiMAX, standards, for example.

Device 600 may comprise a Near-Field Communication, NFC, transceiver 650. NFC transceiver 650 may support at least one NFC technology, such as Bluetooth, Wibree or similar technologies.

Device 600 may comprise User Interface, UI, 660. UI 660 may comprise at least one of a display, a keyboard, a touchscreen, a vibrator arranged to signal to a user by causing device 600 to vibrate, a speaker and a microphone. A user may be able to operate device 600 via UI 660, for example to accept incoming telephone calls, to originate telephone calls or video calls, to browse the Internet, to manage digital files stored in memory 620 or on a cloud accessible via transmitter 630 and receiver 640, or via NFC transceiver 650, and/or to play games.

Device 600 may comprise or be arranged to accept a user identity module 670. User identity module 670 may comprise, for example, a Subscriber Identity Module, SIM, card installable in device 600. A user identity module 670 may comprise information identifying a subscription of a user of device 600. A user identity module 670 may comprise cryptographic information usable to verify the identity of a user of device 600 and/or to facilitate encryption of communicated information and billing of the user of device 600 for communication effected via device 600.

Processor 610 may be furnished with a transmitter arranged to output information from processor 610, via electrical leads internal to device 600, to other devices comprised in device 600. Such a transmitter may comprise a serial bus transmitter arranged to, for example, output information via at least one electrical lead to memory 620 for storage therein. Alternatively to a serial bus, the transmitter may comprise a parallel bus transmitter. Likewise processor 610 may comprise a receiver arranged to receive information in processor 610, via electrical leads internal to device 600, from other devices comprised in device 600. Such a receiver may comprise a serial bus receiver arranged to, for example, receive information via at least one electrical lead from receiver 640 for processing in processor 610. Alternatively to a serial bus, the receiver may comprise a parallel bus receiver.

Device 600 may comprise further devices not illustrated in FIG. 6. For example, where device 600 comprises a smartphone, it may comprise at least one digital camera. Some devices 600 may comprise a back-facing camera and a front-facing camera, wherein the back-facing camera may be intended for digital photography and the front-facing camera for video telephony. Device 600 may comprise a fingerprint sensor arranged to authenticate, at least in part, a user of device 600. In some embodiments, device 600 lacks at least one device described above. For example, some devices 600 may lack a NFC transceiver 650 and/or user identity module 670.

Processor 610, memory 620, transmitter 630, receiver 640, NFC transceiver 650, UI 660 and/or user identity module 670 may be interconnected by electrical leads internal to device 600 in a multitude of different ways. For example, each of the aforementioned devices may be separately connected to a master bus internal to device 600, to allow for the devices to exchange information. However, as the skilled person will appreciate, this is only one example and depending on the embodiment various ways of interconnecting at least two of the aforementioned devices may be selected without departing from the scope of the embodiments.

Figure 7:
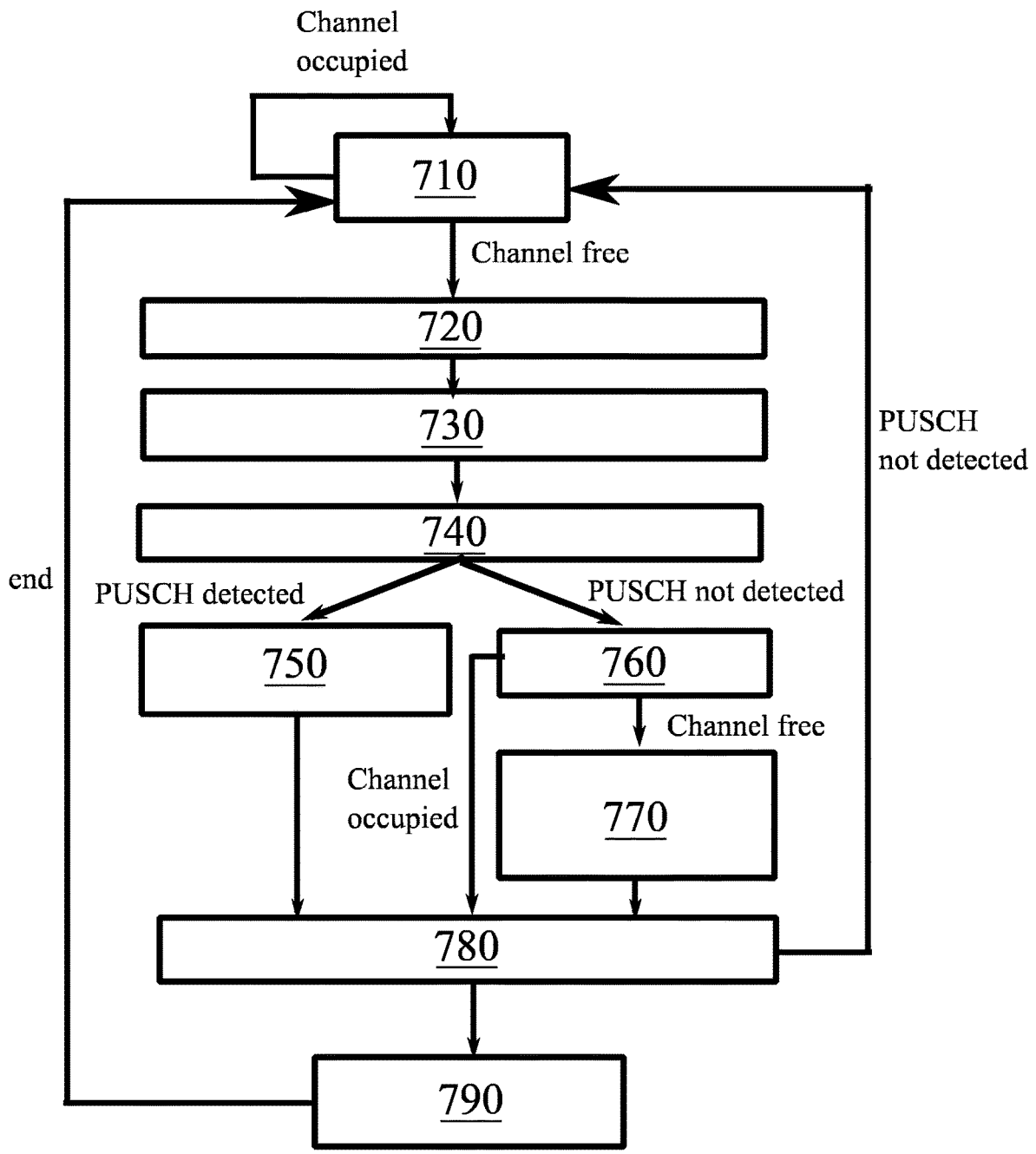
FIG. 7 illustrates a flow graph of an exemplary first process in accordance with at least some embodiments.

FIG. 7 is a flow graph of an exemplary first process in accordance with at least some embodiments. The phases of the illustrated first process method may be performed by BS 130 or a cellular base station in general, or by a control device configured to control the functioning thereof, possibly when installed therein.

The first process may comprise, at step 710, monitoring a frequency channel to determine whether the frequency channel is occupied or not. The monitoring may be referred to listening as well. In some embodiments, the monitoring may be associated with a LBT mechanism. For example, BS 130 may perform LBT Type 1 monitoring, i.e., Cat 4. If the frequency channel is determined as occupied, BS 130 may wait for a certain amount of time and after that perform monitoring of the frequency channel again. However, if it is determined at step 710 that the channel is not occupied, i.e., the channel is free, the first process may proceed to step 720.

The first process may also comprise a step, wherein BS 130 may acquire a COT, i.e., a first period reserved for first transmission opportunities (not shown in FIG. 7). The COT may be acquired using Cat 4 LBT, followed by a DL transmission. UL data transmission may start after the DL transmission. In some embodiments, the COT may be acquired in a similar manner as in LTE enhanced LAA, eLAA, or MulteFire.

The process may comprise, at step 720, starting a COT. The COT may comprise a first DL portion in the beginning of the COT. The first DL portion may refer to a first slot in FIGS. 3, 4 and 5.

It is noted that the exemplary first process demonstrates a scenario, wherein the COT comprises only one switching point. Nevertheless, the exemplary first process may be applied also for the scenario, wherein the COT comprises multiple DL and UL switching points as shown in FIG. 2. In such case a second opportunity for an uplink data transmission, i.e., a second opportunistic resource, may be provided immediately after a last portion of the COT, e.g., after the last DL part of the following COT: DL-UL-DL.

Moreover, at step 720, one or more DL assignments may be transmitted by the network node. DL assignments may be transmitted using PDCCH, i.e., DL control channel 310, 410 and 510 in FIGS. 3, 4 and 5, respectively.

In addition, one or more DL PDSCHs, i.e., DL data transmission 320, 420 and 520 in FIGS. 3, 4 and 5, respectively, may be transmitted at the beginning of the COT. In some embodiments, the first DL portion may comprise a cell or group common PDCCH, e.g., such as DCI 2_0. The cell or group-common PDCCH may indicate the structure of the COT for the UE, e.g. where the scheduled DL and UL slots are located in time, and/or how many opportunities there are for UL repetition/re-transmission at the end of the COT after the last scheduled DL or UL slot or symbol. Also, the cell or group common PDCCH may comprise an indication of an end point for a last scheduled UL or DL portion.

The first process may also comprise, at step, 730, transmitting at least one UL grant for at least one UE. The UL grant may comprise information about an uplink resource, e.g. a PUSCH transmission scheduled for a UE. The uplink grant may be transmitted using DL control channel 310, 410 and 510 as well.

The UL grant may trigger at least one PUSCH transmission within the COT, acquired by the BS. That is to say, the BS may schedule at least one PUSCH transmission at step 730 and transmit a configuration of the scheduled at least one PUSCH transmission using PDCCH. The at least one PUSCH transmission may be associated with a slot, e.g., a second slot in FIGS. 3, 4 and 5. Also, the UL grant and/or the group common PDCCH, e.g., DCI 2_0, may indicate that PUSCH repetition is allowed at the end of the COT, after the at least one scheduled PUSCH transmission. The at least one PUSCH transmission may be associated with a first opportunity for UL data transmission, i.e., the at least one PUSCH transmission may be transmitted using the first opportunity for UL data transmission, depending on whether the frequency channel is occupied or not.

At step, 740, the first process may comprise detecting whether the at least one PUSCH transmission scheduled at step 730 is present or not. Said detecting may comprise detecting the scheduled at least one PUSCH transmission as present by detecting that there is a transmission in the slot associated with the scheduled at least one PUSCH transmission. Similarly, said detecting may comprise detecting the scheduled at least one PUSCH transmission as not present by detecting that there is no transmission in the slot associated with the scheduled at least one PUSCH transmission. With reference to FIG. 5, the scheduled at least one PUSCH transmission may refer to the second slot.

Upon detecting that the at least one PUSCH transmission is present, the first process may proceed to step 750. That is to say, if a PUSCH transmission is detected for at least one UE, the process may proceed to step 750. The first process may comprise, at step 750, receiving the at least one PUSCH transmission using the first opportunity for the at least one PUSCH transmission. Alternatively, or in addition, the first process may comprise, a step 750, receiving the at least one PUCCH transmission using the first opportunity for the PUSCH transmission. After step 750, the process may proceed to step 780.

On the other hand, upon detecting that the at least one PUSCH transmission is not present, the first process may proceed to step 760. The first process may comprise, at step 760, starting a dynamic link direction change within the COT. That is to say, step 760 may comprise performing monitoring of the channel occupancy, i.e., determining whether the channel is occupied or not. The monitoring of the channel may comprise listening, e.g., LBT may be used. For example, LBT Type 2 may be used. In general, LBT Type 2 may be referred to as one shot LBT. Again, with reference to FIG. 5, white triangle represents LBT at symbol 1 of the second slot.

Alternatively, or in addition, upon detecting that the at least one PUSCH transmission is not present, the first process may comprise determining a second opportunity for the at least one PUSCH transmission and receiving or transmitting using the second opportunity.

Upon detecting that the channel is not occupied, i.e., detecting that the channel is free, the first process may proceed to step 770. At step 770, the first process may comprise transmitting a DL transmission within the acquired COT. That is to say, the COT may comprise a second DL portion, which may be used for transmitting a DL transmission if it is detected at step 770 that the channel is not occupied. The second DL portion may be referred to as an opportunity for a DL data transmission, e.g., 425 in FIG. 4 or 525 in FIG. 5, which may be a second opportunistic resource. The first process may proceed to step 780 after step 770.

The first process may comprise, at step 780, detecting whether the at least one PUSCH transmission on a second opportunity for a UL data transmission for is present or not. In some embodiments, if all scheduled PUSCHs were detected at step 740 and received at step 750, it may be determined that there is no transmission related to the at least one PUSCH transmission using the second opportunity for the at least one PUSCH transmission. If it is determined that no PUSCH transmission is present using the second opportunity for the at least one PUSCH transmission, the first process may proceed back to step 710.

Upon detecting that there is at least one PUSCH transmission using the second opportunity for the UL data transmission, the first process may comprise, at step 790, receiving the at least one PUSCH transmission using the second opportunity. Alternatively, or in addition, the first process may comprise, a step 790, receiving at least one PUCCH transmission. The process may proceed to step 710 for acquiring a new, subsequent COT after receiving the scheduled PUSCH or detecting that PUSCH using the second opportunity is not present.

Figure 8:
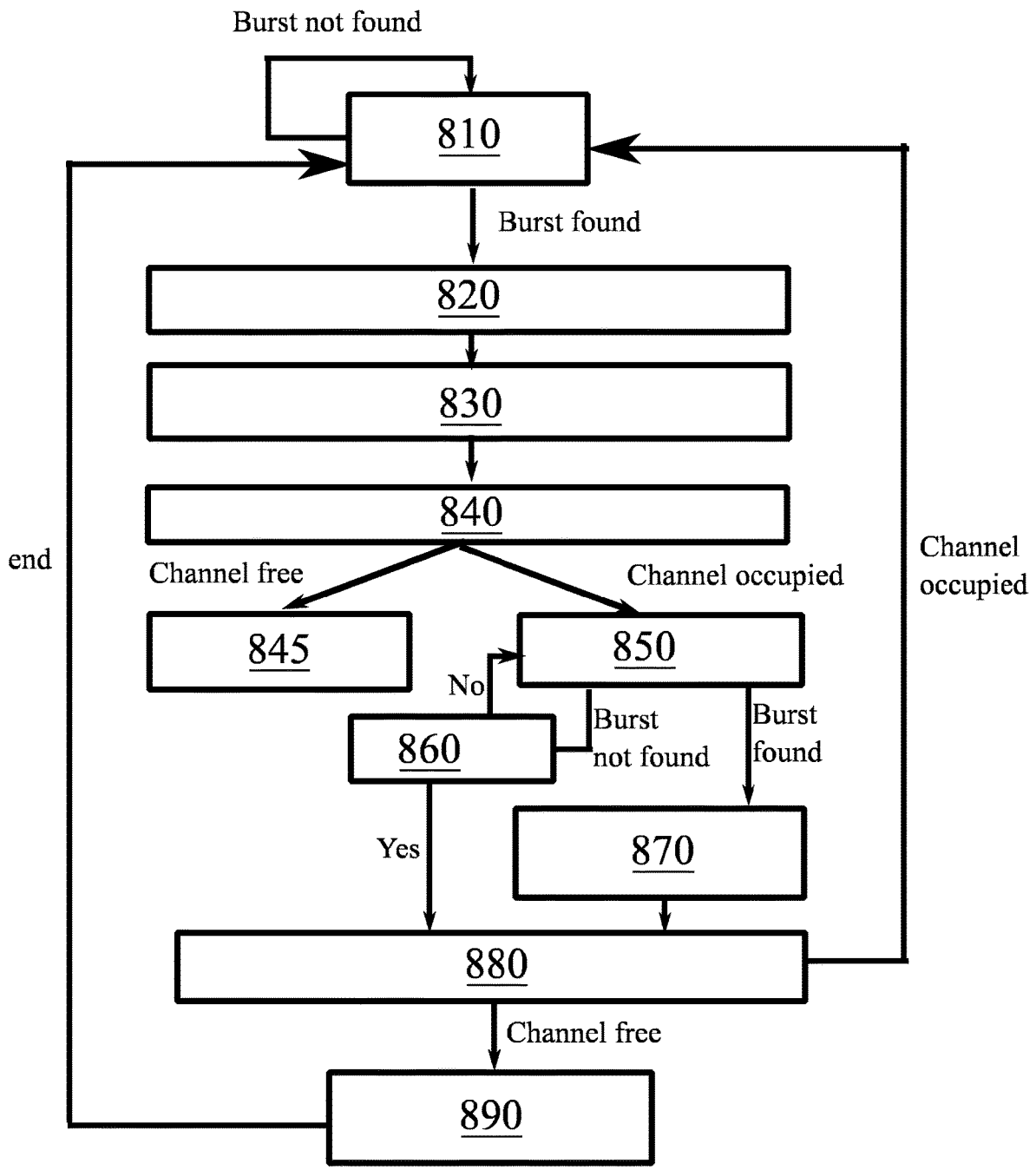
FIG. 8 illustrates a flow graph of an exemplary second process in accordance with at least some embodiments.

FIG. 8 is a flow graph of a second process in accordance with at least some embodiments. The phases of the illustrated second process may be performed by UE 110 or cellular wireless device in general, or by a control device configured to control the functioning thereof, possibly when installed therein.

The second process may comprise, at 810, performing DL burst detection. The DL burst detection may be based on a predefined DL control signal, such as, for example, PDCCH Demodulation Reference Signal, DMRS, Primary Synchronization Signal, PSS, Secondary Synchronization Signal, SSS, Channel State Information-Reference Signal, CSI-RS, or a preamble. The DL burst detection may be performed in the beginning of a COT. With reference to FIGS. 3, 4 and 5, DL burst detection may be performed at symbol 0 of the first slot of the COT. If no DL burst is detected, the detection of a DL burst may be performed again in the beginning of a subsequent COT.

However, if a DL burst is detected, the second process may proceed to step 820. The second process may comprise, at step 820, considering that the COT acquired by a BS has started. Typically the COT may start with a first DL portion during a first slot of the COT as shown in FIGS. 3, 4 and 5.

That is to say, the second process may also comprise, at step 820, starting monitoring of PDCCH, i.e., DL control channel 310, 410 and 510 in FIGS. 3, 4 and 5, respectively. Said monitoring may comprise monitoring from predefined search space set(s). The predefined search spaces may be mapped to predefined Control Resource Sets, CORESETs.

In addition, the second process may comprise, at step 820, receiving one or more DL assignment(s) using the DL control channel. In addition, one or more DL PDSCHs, i.e., DL data transmission 320, 420 and 520 in FIGS. 3, 4 and 5, respectively, may be received at the beginning of the COT. In some embodiments, the first DL portion, or the DL control channel more specifically, may comprise a cell or group common PDCCH, e.g., DCI 2_0. The cell or group-common PDCCH may indicate the structure of the COT for the UE, e.g., where the scheduled DL and UL slots are located in time, and/or how many opportunities there are for UL repetition/re-transmission at the end of the COT after the last scheduled DL or UL slot or symbol. Also, the cell or group common PDCCH may comprise an indication of an end point for a last scheduled UL or DL portion.

The second process may also comprise, at step 830, receiving an UL grant. The UL grant may comprise information about an uplink resource, e.g. PUSCH scheduled for a UE. The UL grant may trigger at least one PUSCH transmission within the COT, acquired by the BS. That is to say, at step 730 a configuration of the scheduled at least one PUSCH transmission may be received. The at least one PUSCH transmission may be associated with a slot, e.g., a second slot in FIGS. 3, 4 and 5. The at least one PUSCH transmission may be associated with a first opportunity for UL data transmission, i.e., the at least one PUSCH transmission may be transmitted using the first opportunity for UL data transmission, depending on whether a frequency channel is occupied or not.

Also, the UL grant and/or the cell or group common PDCCH, e.g., DCI 2_0, may indicate that PUSCH repetition and/or re-transmission is allowed at the end of the COT, after the scheduled portion, possibly using a second opportunity for an UL data transmission. In such a case, a second opportunistic resource may refer to the second opportunity for the UL data transmission.

At step 840, the second process may comprise performing monitoring of the frequency channel occupancy. The monitoring may comprise determining whether the frequency channel is occupied or not, i.e., whether the frequency channel is free or not. The monitoring of the frequency channel may comprise listening, e.g., LBT may be used. For example, LBT Type 2 may be used. In general, LBT Type 2 may be referred to as one shot LBT. The monitoring may be performed in the beginning of the scheduled at least one PUSCH transmission.

If the frequency channel is determined free, the second process may proceed to step 845. For example, with reference to FIG. 3, UE #2 may determine the frequency channel as free at symbol 11 of the first slot of the COT. At step 845, the second process may comprise transmitting the at least one scheduled PUSCH and/or PUCCH, e.g., using the first opportunity for UL data transmission by UE #2 in the second slot of the COT of FIG. 3.

Upon transmitting at step 845, the second process may proceed to step 810, wherein the UE may continue by performing another DL burst detection, e.g., when the first COT ends and subsequent, i.e., second COT starts.

However, if the frequency channel is determined as occupied at step 840, the UE may start detecting a second DL burst at step 850. For example, in FIG. 5, UE #1 and UE #2 may detect DL burst at symbol 1 of the second slot of the COT. Alternatively, or in addition, the UE may determine a second opportunity for UL data transmission, wherein a difference in time between the first and the second opportunity for the UL data transmission is larger than, or equal to, a slot.

The UE may try to detect the second DL burst until the end of the first COT. That is to say, if the second DL burst is not detected at a first time, the second process may proceed to step 860. At step 860, the second process may comprise checking whether the first COT has ended. If not, the second process may move back to step 850, wherein the UE may try to detect the second DL burst for a second time, etc. However, if it is determined that the first COT has ended at step 860, the second process may proceed to step 880.

On the other hand, if the second DL burst is detected at step 860, the UE may assume that the first COT comprises a second DL burst. That is to say, the UE may consider that the COT continues with the second DL burst. The second DL burst may be transmitted using the second opportunistic resource, i.e., the opportunity for a DL transmission. For example, as shown in FIG. 5, the opportunity for the DL transmission may be within a first opportunity for an UL data transmission, i.e., within the second slot of the COT.

That is to say, the second process may comprise, at step 870, starting monitoring of a DL control channel, e.g., PDCCH, upon detecting the second DL burst at step 860. For example, in FIG. 5 UE #2 and UE #2 may monitor PDCCH at symbol 2 of the second slot of the COT. Said monitoring may comprise monitoring from predefined search space set(s). The predefined search spaces may be mapped to predefined CORESETs. In some embodiments, the UE may assume that the second DL burst continues until the end of the scheduled part of the COT, i.e., the end of the scheduled at least one PUSCH transmission. The UE may thus receive a downlink transmission using the opportunity for the DL transmission upon detecting that the frequency is occupied for an UL transmission using the first opportunity for the UL transmission.

At step 880, the second process may comprise performing a second monitoring of the channel, e.g., by using LBT, such as, Type 2 LBT. The second monitoring of the channel may be done for a second opportunity for uplink data transmission. For example, in FIG. 3, UE #1 may monitor the frequency channel at symbol 1 of the third slot. The second monitoring of the channel may be performed at a predetermined point in time after the scheduled at least one PUSCH transmission in the COT or after the COT.

If the channel is still found to be occupied at step 880, the second process may proceed back to step 810, wherein the UE may try to detect a DL burst corresponding to the second, subsequent COT.

However, if the channel is determined as free at step 880, the UE may transmit the at least one PUSCH transmission using the second opportunity for the UL data transmission. With reference to FIG. 3, UE #1 may transmit the at least one PUSCH transmission during the third slot, i.e., during the second opportunity for UL data transmission. The second process may then proceed back to step 810, wherein the UE may try to detect a DL burst corresponding to the second, subsequent COT.

In general, the second opportunity for the UL data transmission may be offered to UEs which suffer from high LBT blockage ratio.

If the second opportunity for the UL data transmission is offered for a single PUSCH transmission per UE and per COT, UEs may not need to be aware of a duration of the COT or duration of the MCOT. In such a case, UEs may follow instructions of the BS. However, if the second opportunity for the uplink data transmission is offered for multiple UEs, multiple HARQ processes or if multiple transmit opportunities are offered, either scheduling UL grant or cell/group common PDCCH may contain indication of the duration of the COT.

MCOT, i.e., maximum period of time, may be configured by higher layers to UE. For example, the MCOT may be a maximum COT allowed by regulations. In some embodiments, the MCOT may need to be known by UE. In such cases the MCOT a higher layer configured parameter that is upper bounded by regional regulations.

Figure 9:
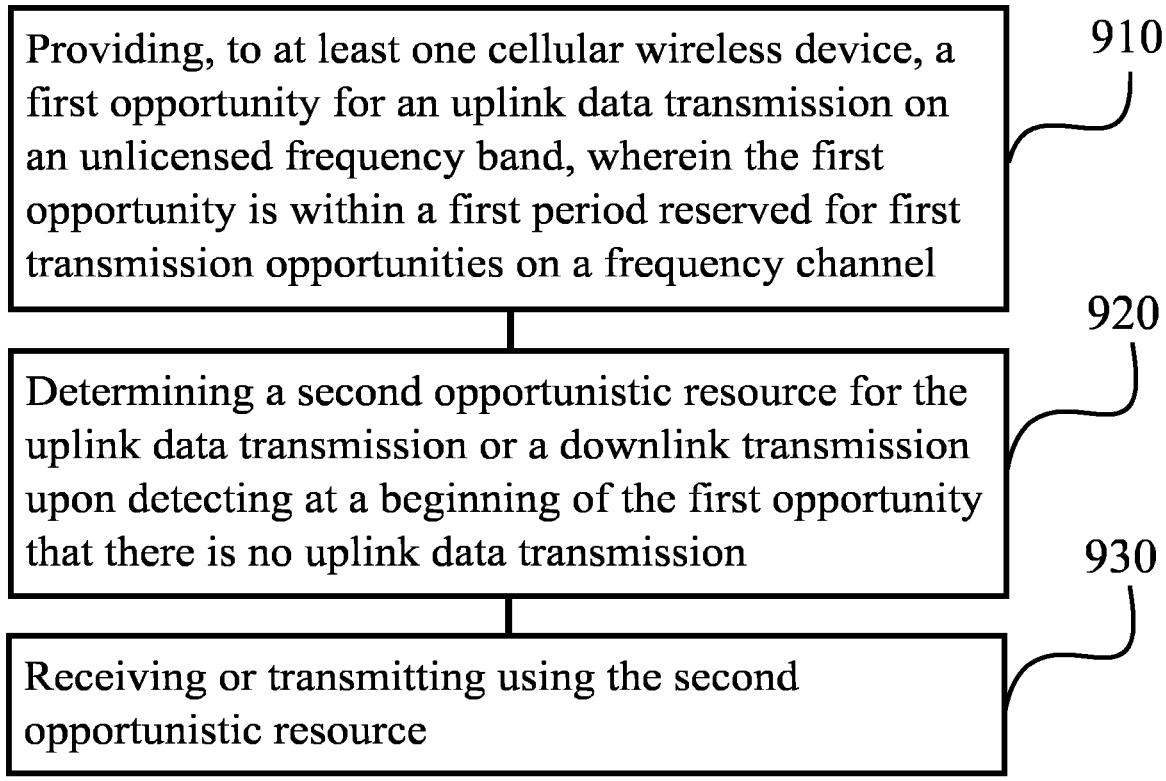
FIG. 9 illustrates a flow graph of a first method in accordance with at least some embodiments.

FIG. 9 is a flow graph of a first method in accordance with at least some embodiments. The phases of the illustrated first method may be performed by BS 130 or a cellular base station in general, or by a control device configured to control the functioning thereof, possibly when installed therein. The first method may correspond to the first process.

The first method may comprise, at step 910, providing, to at least one cellular wireless device, a first opportunity for an uplink data transmission on an unlicensed frequency band, wherein the first opportunity is within a first period reserved for first transmission opportunities on a frequency channel. The first method may also comprise, at step 920, determining a second opportunistic resource for the uplink data transmission or a downlink transmission upon detecting at a beginning of the first opportunity that there is no uplink data transmission. Finally, at step 930, the first method may comprise receiving or transmitting using the second opportunistic resource.

Figure 10:
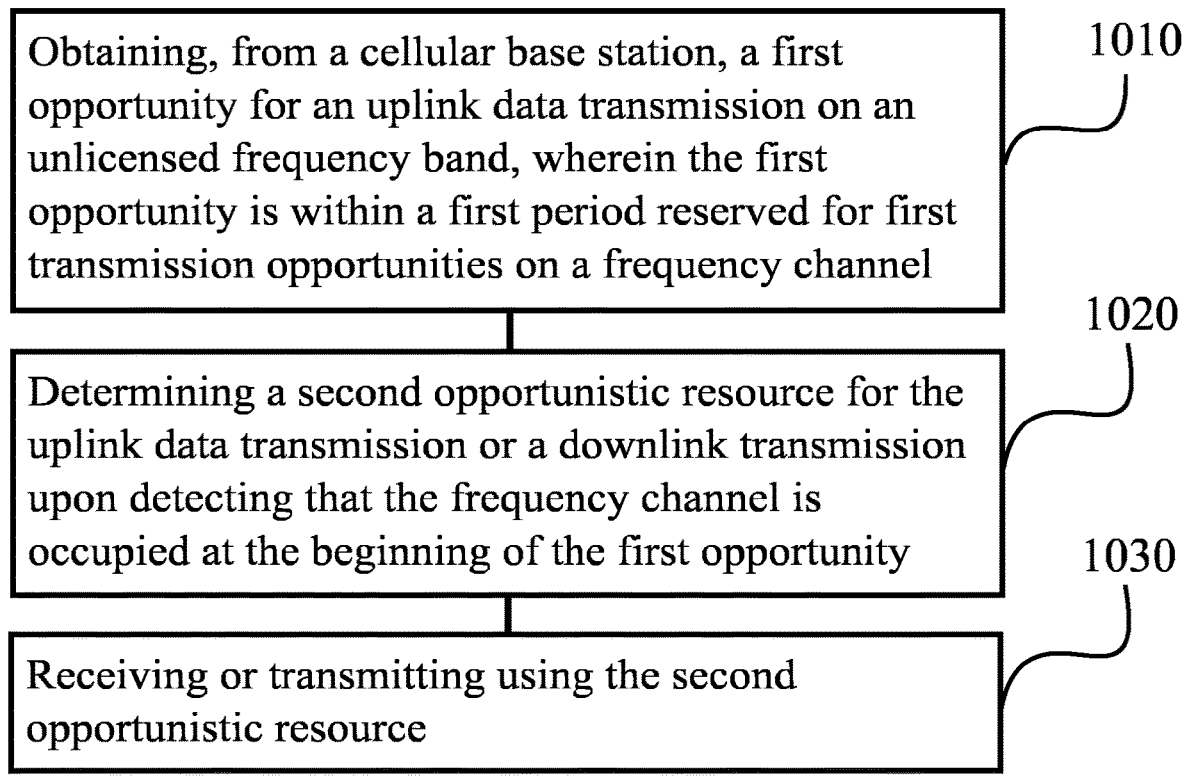
FIG. 10 illustrates a flow graph of a second method in accordance with at least some embodiments.

FIG. 10 is a flow graph of a second method in accordance with at least some embodiments. The phases of the illustrated second method may be performed by UE 110, or wireless cellular device in general, or by a control device configured to control the functioning thereof, possibly when installed therein. The second method may correspond to the second process.

The second method may comprise, at step 1010, obtaining, from a cellular base station, a first opportunity for an uplink data transmission on an unlicensed frequency band, wherein the first opportunity is within a first period reserved for first transmission opportunities on a frequency channel. The second method may also comprise, at step 1020, determining a second opportunistic resource for the uplink data transmission or a downlink transmission upon detecting that the frequency channel is occupied at a beginning of the first opportunity. Finally, the second method may comprise, at step 1030, receiving or transmitting using the second opportunistic resource.

Embodiments of the present invention provide improved operation for cellular communication networks on unlicensed frequency bands. For example, efficient exploitation of resources may be provided if a cellular wireless device determines that a frequency channel is occupied at a beginning of a scheduled uplink data transmission. More specifically, some embodiments provide improved UL and DL access if a scheduled PUSCH transmission is prevented due to LBT procedure. Embodiments of the present invention may be exploited, for example, for NR-U.

Embodiments of the present invention provide at least a first and a second opportunity for PUSCH transmission such that there is a sufficient time gap between different transmission attempts. Also, the BS may be allowed to dynamically select the UEs for which the second opportunities for PUSCH transmission may be offered. Moreover, embodiments do not create additional overhead in the cases when UL LBT is successful while the COT acquired by the BS may utilized maximally.

Embodiments of the present invention also minimize the amount of DTX periods within the COT, despite of LBT failure at UE. In addition, the risk that channel access is lost during COT, e.g., due to a DTX period may be minimized. Embodiments of the present invention provide these benefits with a small amount of additional signaling.

It is to be understood that the embodiments disclosed are not limited to the particular structures, process steps, or materials disclosed herein, but are extended to equivalents thereof as would be recognized by those ordinarily skilled in the relevant arts. It should be also understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, a terminal or a network node, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, a terminal or a network node, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in wireless communication networks, wherein it is desirable to improve operation of cellular communication networks on unlicensed frequency bands.

ACRONYMS LIST

3GPP 3rd Generation Partnership Project
BS Base Station
CoMP Coordinated Multi Point
CORESET Control Resource Set
COT Channel Occupancy Time
CSI-RS Channel State Information-Reference Signal
DCI Downlink Control Information
DL Downlink
DMRS Demodulation Reference Signal
DTX Discontinuous Transmission
DU Distributed Unit
eLAA enchanced LAA
FDMA Frequency Division Multiple Access
GC-PDCCH Group-Common Physical Downlink Control Channel
GSM Global System for Mobile communication
HARQ Hybrid Automatic Repeat Request
HARQ-IR HARQ Incremental Redundancy
IoT Internet of Things
LAA Licensed Assisted Access
LBT Listen-Before-Talk
LTE Long-Term Evolution
M2M Machine-to-Machine
MOOT Maximum COT
MCS Modulation and Coding Set
NDI New Data Indicator
NFC Near-Field Communication
NR New Radio
NR-U NR Unlicensed
PRB Physical Resource Block
PDCCH Physical Downlink Control Channel
PDSCH Physical Downlink Shared Channel
PSS Primary Synchronization Signal
PUCCH Physical Uplink Control Channel
PUSCH Physical Uplink Shared Channel
RAT Radio Access Technology
RRC Radio Resource Control
RV Redundancy Version
SIM Subscriber Identity Module
SSS Secondary Synchronization Signal
UCI Uplink Control Information
UE User Equipment
UL Uplink
UI User Interface
WCDMA Wideband Code Division Multiple Access
WiMAX Worldwide Interoperability for Microwave Access
WLAN Wireless Local Area Network

| REFERENCE SIGNS LIST | |
|---|---|
| 110, 120 | User Equipment |
| 130 | Base Station |
| 140 | Core network |
| 115, 125 | Interfaces |
| 210, 220, 230, 240 | LBTs in FIG. 2 |
| 215, 225, 235 | Switching points in FIG. 2 |
| 310, 410, 510 | DL control channel |
| 320, 420, 520 | DL data transmission |
| 330, 430, 530 | Guard period |
| 335, 435, 535 | Period wherein there is no transmission |
| 340, 440 | UL control channel |
| 350, 450, 550 | First opportunity for UL data transmission |
| 360 | Second opportunity for UL data transmission |
| 425, 525 | Opportunity for DL transmission |
| 710-790 | Steps of the first process of FIG. 7 |
| 810-890 | Steps of the second process of FIG. 8 |
| 910-930 | Phases of the first method of FIG. 9 |
| 1010-1030 | Phases of the second method of FIG. 10 |

What is claimed is:

1. A method for a cellular wireless device, comprising:
obtaining, from a cellular base station, a first opportunity for an uplink data transmission on an unlicensed frequency band, wherein the first opportunity is within a first period reserved for first transmission opportunities on a frequency channel;
upon detecting that the frequency channel is occupied at a beginning of the first opportunity, determining a second opportunistic resource for the uplink data transmission or a downlink transmission using dynamic link direction change within a Channel Occupancy Time (COT); and
receiving or transmitting using the second opportunistic resource, wherein a starting time of the second opportunistic resource is aligned with a Physical Downlink Control Channel (PDCCH) monitoring occasion of the cellular wireless device.

2. A method according to claim 1, wherein the first period reserved for first transmission opportunities is acquired by the cellular base station of a cellular communication system.

3. A method according to claim 2, wherein the second opportunistic resource is a second opportunity for the uplink data transmission and a difference in time between the first and the second opportunity for the uplink data transmission is at least as long as a slot.

4. A method according to claim 3, further comprising determining an ending time of the first period reserved for first transmission opportunities and an ending time of a maximum period of time based on a received signalling, wherein the received signalling comprises a group or cell common control signalling.

5. A method according to claim 4, further comprising:
determining an ending time of a maximum period of time, wherein the ending time of the maximum period of time is equal to, or larger than, an ending time of the first period reserved for first transmission opportunities.

6. A method according to claim 4, wherein the second opportunistic resource is a second opportunity for the uplink data transmission outside of the first period reserved for first transmission opportunities and within the maximum period of time.

7. A method according to claim 4, wherein the second opportunistic resource is a second opportunity for the uplink data transmission outside of the first period reserved for first transmission opportunities and outside of the maximum period of time.

8. A method according to claim 4, wherein the second opportunistic resource is a second opportunity for the uplink data transmission, and the method further comprises:
determining that the second opportunity is provided for 'N' consecutive slots corresponding to 'N' Hybrid Automatic Request (HARQ) processes, wherein 'N' represents a difference in time between an end of COT and an ending time of maximum COT; and
transmitting the uplink data transmission using the second opportunity for the uplink data transmission upon determining that the frequency channel is not occupied.

9. A method according to claim 4, wherein the second opportunistic resource is a second opportunity for the uplink data transmission, and the method further comprises:
determining whether the maximum period of time would be exceeded; and
selecting, based on the determination, a type of listen-before-talk procedure to be performed before the second opportunity for the uplink data transmission.

10. A method according to claim 9, further comprising:
upon determining that the maximum period of time has been exceeded, performing a first type listen-before-talk procedure on the frequency channel before the second opportunity for the uplink data transmission.

11. A method according to claim 9, further comprising:
upon determining that the maximum period of time would not be exceeded, performing a second type listen-before-talk procedure on the frequency channel before the second opportunity for the uplink data transmission.

12. A method according to claim 9, wherein the second opportunistic resource is an opportunity for a downlink transmission, and the method further comprises:
upon detecting that the frequency channel is occupied at the beginning of the first opportunity for the uplink data transmission, determining the opportunity for the downlink transmission.

13. A method according to claim 12, wherein the opportunity for the downlink transmission is within, or at least partially overlapping with, the first opportunity for the uplink data transmission.

14. A method according to claim 12, wherein the opportunity for the downlink transmission is within a second period reserved for first transmission opportunities, wherein the second period reserved for first transmission opportunities is subsequent to the first period reserved for first transmission opportunities.

15. A method according to claim 12, further comprising:
receiving the downlink transmission using the opportunity for the downlink transmission.

16. A method according to claim 12, wherein the detecting that the frequency channel is occupied comprises using a listen-before-talk procedure.

17. An apparatus comprising:
at least one processing core,
at least one non-transitory memory including computer program code, the at least one memory and the computer program code being configured to, with the at least one processing core, cause the apparatus at least to perform:
obtain, from a cellular base station, a first opportunity for an uplink data transmission on an unlicensed frequency band, wherein the first opportunity is within a first period reserved for first transmission opportunities on a frequency channel;
determine, upon detecting that the frequency channel is occupied at a beginning of the first opportunity, a second opportunistic resource for the uplink data transmission or a downlink transmission using dynamic link direction change within a Channel Occupancy Time (COT); and
receive or transmitting using the second opportunistic resource, wherein a starting time of the second opportunistic resource is aligned with a Physical Downlink Control Channel (PDCCH) monitoring occasion of the apparatus.

18. An apparatus according to claim 17, wherein the at least one memory and the computer program code are further configured to, with the at least one processing core, cause the apparatus to acquire the first period reserved for first transmission opportunities by the cellular base station of a cellular communication system.

19. An apparatus comprising:
at least one processing core,
at least one non-transitory memory including computer program code, the at least one memory and the computer program code being configured to, with the at least one processing core, cause the apparatus at least to:
provide, to at least one cellular wireless device, a first opportunity for an uplink data transmission on an unlicensed frequency band, wherein the first opportunity is within a first period reserved for first transmission opportunities on a frequency channel;
determine, upon detecting at a beginning of the first opportunity that there is no uplink data transmission, a second opportunistic resource for the uplink data transmission or a downlink transmission using dynamic link direction change within a Channel Occupancy Time (COT); and
receive or transmitting using the second opportunistic resource, wherein a starting time of the second opportunistic resource is aligned with a Physical Downlink Control Channel (PDCCH) monitoring occasion of the cellular wireless device.

* * * * *